US 11,017,907 B2

(12) United States Patent
Clarkson et al.

(10) Patent No.: US 11,017,907 B2
(45) Date of Patent: May 25, 2021

(54) NUCLEAR REACTOR PROTECTION SYSTEMS AND METHODS

(71) Applicants: NuScale Power, LLC, Corvallis, OR (US); ROCK CREEK INNOVATIONS, LLC, Waverly, KS (US)

(72) Inventors: Gregory Wayne Clarkson, Waverly, KS (US); Rufino Ayala, Corvallis, OR (US); Jason Pottorf, Lebanon, OR (US)

(73) Assignees: NuScale Power, LLC, Corvallis, OR (US); Rock Creek Innovations, LLC, Waverly, KS (US)

( * ) Notice: Subject to any disclaimer, the term of this patent is extended or adjusted under 35 U.S.C. 154(b) by 2452 days.

(21) Appl. No.: 14/198,891

(22) Filed: Mar. 6, 2014

(65) Prior Publication Data

US 2020/0343009 A1    Oct. 29, 2020

Related U.S. Application Data

(60) Provisional application No. 61/922,625, filed on Dec. 31, 2013.

(51) Int. Cl.
*G21C 9/00* (2006.01)
*G21C 7/36* (2006.01)
(Continued)

(52) U.S. Cl.
CPC ............... *G21C 9/00* (2013.01); *G21C 7/36* (2013.01); *G05B 9/02* (2013.01); *G06F 1/28* (2013.01);
(Continued)

(58) Field of Classification Search
CPC .. G21C 9/00; G21C 17/00; G21C 7/36; G06F 1/28; G21D 3/04; G21D 3/06; G05B 9/02; H02H 3/05
See application file for complete search history.

(56) References Cited

U.S. PATENT DOCUMENTS 3,597,939 A    8/1971  Ripley et al.
4,661,310 A *  4/1987  Cook ..................... G05B 9/03
                                                    376/215
(Continued)

FOREIGN PATENT DOCUMENTS

CN    1075224    8/1993
CN    1226732    8/1999
(Continued)

OTHER PUBLICATIONS

International Preliminary Report on Patentability in International Application No. PCT/US2014/072224, dated Jul. 5, 2016, 9 pages.
(Continued)

*Primary Examiner* — Lily C Garner
(74) *Attorney, Agent, or Firm* — Perkins Coie LLP

(57) ABSTRACT

A nuclear reactor protection system includes a plurality of functionally independent modules, each of the modules configured to receive a plurality of inputs from a nuclear reactor safety system, and logically determine a safety action based at least in part on the plurality of inputs; and one or more nuclear reactor safety actuators communicably coupled to the plurality of functionally independent modules to receive the safety action determination based at least in part on the plurality of inputs.

39 Claims, 15 Drawing Sheets

(51) Int. Cl.
  *G21D 3/06* (2006.01)
  *G21D 3/04* (2006.01)
  *G05B 9/02* (2006.01)
  *H02H 3/05* (2006.01)
  *G21C 17/00* (2006.01)
  *G06F 1/28* (2006.01)

(52) U.S. Cl.
  CPC ............... *G21C 17/00* (2013.01); *G21D 3/04* (2013.01); *G21D 3/06* (2013.01); *H02H 3/05* (2013.01)

(56) References Cited

U.S. PATENT DOCUMENTS

| | | |
|---|---|---|
| 5,621,776 A | 4/1997 | Gaubatz |
| 6,049,578 A | 4/2000 | Senechal et al. |
| 6,369,836 B1 | 4/2002 | Larson |
| 6,449,732 B1 | 9/2002 | Rasmussen |
| 6,532,550 B1 * | 3/2003 | Crew .................. G05B 9/03 714/11 |
| 6,754,846 B2 | 6/2004 | Rasmussen |
| 6,988,221 B2 | 1/2006 | Rasmussen |
| 7,102,343 B1 | 9/2006 | Brown |
| 7,558,292 B2 | 7/2009 | Gunston |
| 7,840,285 B2 | 11/2010 | Wilson |
| 7,870,299 B1 | 1/2011 | Sorensen |
| 8,037,356 B2 | 10/2011 | Rasmussen |
| 8,117,512 B2 | 2/2012 | Sorensen |
| 8,156,251 B1 | 4/2012 | Sorensen |
| 8,331,855 B2 | 12/2012 | Williams |
| 8,498,900 B1 | 7/2013 | Spirin et al. |
| 8,615,313 B2 | 12/2013 | Wilson |
| 2002/0002538 A1 | 1/2002 | Ling |
| 2003/0149576 A1 | 8/2003 | Sunyich |
| 2006/0031713 A1 | 2/2006 | Rasmussen |
| 2007/0076765 A1 | 4/2007 | Gunston |
| 2007/0083444 A1 | 4/2007 | Matthews et al. |
| 2007/0244571 A1 | 10/2007 | Wilson |
| 2008/0109677 A1 | 5/2008 | Rasmussen |
| 2010/0068464 A1 | 3/2010 | Meyer |
| 2011/0066598 A1 | 3/2011 | Wilson |
| 2011/0173060 A1 | 7/2011 | Gallagher |
| 2011/0178863 A1 | 7/2011 | Daigle |
| 2011/0187493 A1 | 8/2011 | Elfstrom et al. |
| 2011/0131580 A1 | 12/2011 | Bakhmach |
| 2011/0302504 A1 | 12/2011 | Khare et al. |
| 2011/0313580 A1 | 12/2011 | Bakhmach |
| 2012/0009868 A1 | 1/2012 | Williams |
| 2012/0108216 A1 | 5/2012 | Wohlwend et al. |
| 2012/0147868 A1 | 6/2012 | Williams |
| 2013/0282641 A1 | 10/2013 | Martin |
| 2013/0304578 A1 | 11/2013 | Kannan et al. |
| 2014/0169514 A1 | 6/2014 | Lemm et al. |
| 2015/0325318 A1 | 11/2015 | Singh |

FOREIGN PATENT DOCUMENTS

| | | |
|---|---|---|
| CN | 102426863 | 4/2012 |
| EP | 0781451 | 12/2001 |
| JP | H7-174890 | 7/1995 |
| JP | H10-104385 | 4/1998 |
| JP | H10-506476 | 6/1998 |
| JP | 2001-296383 | 10/2001 |
| JP | 2010-249559 | 11/2010 |
| KR | 10-2008-0013153 | 2/2008 |
| KR | 10-2009-0054837 | 1/2009 |
| KR | 10-2009-0054 | 6/2009 |
| KR | 10-2010-0044544 | 4/2010 |

OTHER PUBLICATIONS

International Search Report and Written Opinion in International Application No. PCT/US2014/072224, dated Sep. 14, 2015, 11 pages.

JP Office Action in Japanese Application No. 2016-544596, dated Aug. 7, 2018, 9 pages, with English Translation.

Nath et al., "RFID Technology and Applications", IEEE Pervasive Computing, 5(1):22-24, Jan. 1, 2006.

Korean Patent Office, "International Search Report and Written Opinion of the International Searching Authority" for PCT Application No. PCT/US2014/072224, dated Sep. 14, 2015, 11 pages.

\* cited by examiner

FIG. 4A

| TRANSIENT EVENT | SAFETY FUNCTION | PROCESS PARAMETER | SEPARATION GROUP | | | | TRIP/NO TRIP DETERMINATION |
|---|---|---|---|---|---|---|---|
| | | | A | B | C | D | |
| LOSS OF FEEDWATER | A1 | HIGH TEMPERATURE | ✓ | ✓ | ✓ | ✓ | TRIP |
| | A2 | HIGH PRESSURE | ✓ | ✓ | ✓ | ✓ | TRIP |

| TRANSIENT EVENT | SAFETY FUNCTION | PROCESS PARAMETER | SEPARATION GROUP | | | | TRIP/NO TRIP DETERMINATION |
|---|---|---|---|---|---|---|---|
| | | | A | B | C | D | |
| LOSS OF FEEDWATER | A1 | HIGH TEMPERATURE | CCF | ✓ | CCF | ✓ | TRIP |
| | A2 | HIGH PRESSURE | ✓ | ✓ | ✓ | ✓ | TRIP |

450

NUCLEAR REACTOR PROTECTION SYSTEMS AND METHODS

CROSS-REFERENCE TO RELATED APPLICATION

This application claims priority under 35 U.S.C. § 119 to U.S. Provisional Patent Application Ser. No. 61/922,625, filed Dec. 31, 2013, the entire contents of which are hereby incorporated by reference.

TECHNICAL BACKGROUND

This disclosure describes a nuclear reactor protection system and associated methods thereof.

BACKGROUND

Nuclear reactor protection systems and, generally, nuclear reactor instrumentation and control (I&C) systems provide automatic initiating signals, automatic and manual control signals, and monitoring displays to mitigate the consequences of fault conditions. For example, I&C systems provide protection against unsafe reactor operation during steady state and transient power operation. During normal operation I&C systems measure various parameters and transmit the signals to control systems. During abnormal operation and accident conditions, the I&C systems transmit signals to the reactor protection system and, in some cases a reactor trip system (RTS) and engineered safety features actuation system (ESFAS) of the reactor protection system, to initiate protective actions based on predetermined set points.

SUMMARY

In a general implementation according to the present disclosure, a nuclear reactor protection system includes a plurality of functionally independent modules, each of the modules configured to receive a plurality of inputs from a nuclear reactor safety system, and logically determine a safety action based at least in part on the plurality of inputs; and one or more nuclear reactor safety actuators communicably coupled to the plurality of functionally independent modules to receive the safety action determination based at least in part on the plurality of inputs.

In a first aspect combinable with the general implementation, each of the plurality of functionally independent modules provides protection against a single failure propagation to any other of the plurality of functionally independent modules.

In a second aspect combinable with any of the previous aspects, the nuclear reactor safety system includes an engineered safety features actuation system (ESFAS), and the plurality of functionally independent modules receive a plurality of ESFAS inputs and logically determine an ESFAS component actuation based at least in part on the ESFAS inputs.

In a third aspect combinable with any of the previous aspects, the plurality of functionally independent modules provide for redundant ESFAS voting divisions.

In a fourth aspect combinable with any of the previous aspects, the nuclear reactor safety system includes a reactor trip system (RTS), and the plurality of functionally independent modules receive a plurality of RTS inputs and logically determine an RTS component actuation based at least in part on the RTS inputs.

In a fifth aspect combinable with any of the previous aspects, the plurality of functionally independent modules provide for redundant RTS voting divisions.

In a sixth aspect combinable with any of the previous aspects, each of the plurality of functionally independent modules provides protection against a single hardware failure propagation to any other of the plurality of functionally independent modules.

In a seventh aspect combinable with any of the previous aspects, each of the plurality of functionally independent modules provides protection against a single software failure propagation to any other of the plurality of functionally independent modules.

In an eighth aspect combinable with any of the previous aspects, each of the plurality of functionally independent modules provides protection against a single software developed logic failure propagation to any other of the plurality of functionally independent modules.

In a ninth aspect combinable with any of the previous aspects, the plurality of functionally independent modules provides for triple redundancy for a signal path of a reactor trip sensing and determination.

In a tenth aspect combinable with any of the previous aspects, the plurality of functionally independent modules provide include independent trip voting modules per reactor trip component.

In an eleventh aspect combinable with any of the previous aspects, the plurality of functionally independent modules logically determine the reactor trip separately from every other module of the plurality of modules dedicated to the particular trip component.

In a twelfth aspect combinable with any of the previous aspects, the plurality of functionally independent modules provide include independent ESFAS actuation voting modules per ESF component.

In a thirteenth aspect combinable with any of the previous aspects, the plurality of functionally independent modules logically determine the ESFAS actuation separately from every other module of the plurality of modules dedicated to the particular ESF component.

In a fourteenth aspect combinable with any of the previous aspects, the plurality of functionally independent modules include a plurality of safety function modules.

In a second aspect combinable with any of the previous aspects, the plurality of functionally independent modules include a plurality of communication modules.

In a fifteenth aspect combinable with any of the previous aspects, the plurality of functionally independent modules include a plurality of equipment interface modules.

In a sixteenth aspect combinable with any of the previous aspects, the plurality of functionally independent modules logically determine the reactor trip in a single-tier voting scheme.

In a seventeenth aspect combinable with any of the previous aspects, the plurality of functionally independent modules logically determine the reactor trip in a multiple-tier voting scheme.

In an eighteenth aspect combinable with any of the previous aspects, the multiple-tier voting scheme includes a two-tier voting scheme.

In a nineteenth aspect combinable with any of the previous aspects, a first tier of the two-tier voting scheme includes a majority voting scheme.

In a twentieth aspect combinable with any of the previous aspects, the majority voting scheme includes a two out of three voting scheme.

In a twenty-first aspect combinable with any of the previous aspects, a second tier of the two-tier voting scheme includes a non-majority vote scheme.

In a twenty-second aspect combinable with any of the previous aspects, the second tier includes a two out of four vote scheme.

In another general implementation according to the present disclosure, a method for determining a nuclear reactor trip includes receiving, from one of an engineered safety features actuation system (ESFAS) or a reactor trip system (RTS), a plurality of inputs at a plurality of functionally independent modules of a nuclear reactor protection system; logically determining, with the plurality of functionally independent modules, one of an ESFAS safety action or reactor trip determination, based at least in part on the plurality of inputs; and based on the logical determination, activating one of an ESFAS component actuator or a reactor trip breaker communicably coupled to the plurality of functionally independent modules.

A first aspect combinable with the general implementation further includes limiting, with one of the plurality of functionally independent modules, a single failure propagation to any other of the plurality of functionally independent modules.

In a second aspect combinable with any of the previous aspects, the single failure includes at least one of: a single hardware failure, a single software failure, or a single software developed logic failure.

In a third aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination through a triple redundancy signal path.

In a fourth aspect combinable with any of the previous aspects, the plurality of functionally independent modules provide for at least one of redundant RTS voting divisions or redundant ESFAS voting divisions.

In a fifth aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination through independent trip voting modules per reactor trip component.

In a sixth aspect combinable with any of the previous aspects, logically determining, with the plurality of functionally independent modules, one of an ESFAS safety action or reactor trip determination, based at least in part on the inputs includes logically determining, with a particular module of the plurality of functionally independent modules, the ESFAS safety action or reactor trip determination separately from every other module of the plurality of modules.

In a seventh aspect combinable with any of the previous aspects, the plurality of functionally independent modules provide include independent ESFAS actuation voting modules per ESF component, the method further including logically determining, with a particular module of the plurality of functionally independent modules, the ESFAS actuation separately from every other module of the plurality of modules dedicated to the particular ESF component.

In an eighth aspect combinable with any of the previous aspects, the plurality of functionally independent modules include a plurality of safety function modules, a plurality of communication modules, and a plurality of equipment interface modules.

In a ninth aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination in a single-tier voting scheme.

In a tenth aspect combinable with any of the previous aspects, logically determining, with the plurality of functionally independent modules, one of an ESFAS safety action or reactor trip determination, based at least in part on the inputs includes logically determining, with the plurality of functionally independent modules, the ESFAS safety action or reactor trip determination in a multiple-tier voting scheme.

In an eleventh aspect combinable with any of the previous aspects, the multiple-tier voting scheme includes a two-tier voting scheme.

In a twelfth aspect combinable with any of the previous aspects, a first tier of the two-tier voting scheme includes a majority voting scheme.

In a thirteenth aspect combinable with any of the previous aspects, the majority voting scheme includes a two out of three voting scheme.

In a fourteenth aspect combinable with any of the previous aspects, a second tier of the two-tier voting scheme includes a non-majority vote scheme.

In a fifteenth aspect combinable with any of the previous aspects, the second tier includes a two out of four vote scheme.

In another general implementation according to the present disclosure, a nuclear reactor protection system includes a plurality of functionally independent modules that limits migration of a single failure to a single module.

In another general implementation according to the present disclosure, a nuclear reactor protection system includes a plurality of functionally independent modules that include by only three types of modules, thereby minimizing a number of line replaceable units.

In another general implementation according to the present disclosure, a nuclear reactor protection system includes a plurality of functionally independent modules that include a communication module that determines a schedule of data passage through a data bus.

In another general implementation according to the present disclosure, a nuclear reactor protection system includes a reactor trip system that defines a system architecture in which data is transmitted from the reactor trip system to a control room through a path that is exclusively associated with a safety function, rather than, for example, a post-accident monitoring function.

In another general implementation according to the present disclosure, a nuclear reactor protection system includes a plurality of functionally independent modules, each of which is dedicated to a particular reactor trip breaker among a plurality of reactor trip breakers in the system.

In another general implementation according to the present disclosure, a nuclear reactor protection system includes a plurality of functionally independent modules, each of which makes a reactor trip/no trip determination, or an ESFAS actuation/no actuation determination, completely independent of all of the other modules.

In another general implementation according to the present disclosure, a nuclear reactor protection system includes a plurality of functionally independent modules, each of which is dedicated to a particular ESFAS equipment actuators among a plurality of ESFAS equipment actuators in the system.

Various implementations of a nuclear reactor protection system according to the present disclosure may include one, some, or all of the following features. For example, the reactor protection system may mitigate common-cause failures (CCF) caused by software or software-developed logic errors that could defeat and/or disable a safety function in the system. As another example, the reactor protection system may incorporate key attributes including independence, redundancy, determinism, multi-layered diversity, testability, and diagnostics. The reactor protection system may ensure that the nuclear reactor is maintained in a safe condition. As another example, the reactor protection system may have increased simplicity through a symmetrical architecture with the functionality implemented in individual logic engines dedicated to a particular function. As yet another example, the reactor protection system may facilitate communications within the architecture based on simple deterministic protocols and communicated via redundant paths.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 4A-4B illustrate example charts that illustrate a multi-layered diversity strategy that mitigates software- or software-logic based common-cause failures within an MPS ensuring the I&C system can perform its intended safety function(s);

DETAILED DESCRIPTION

Figure 1:
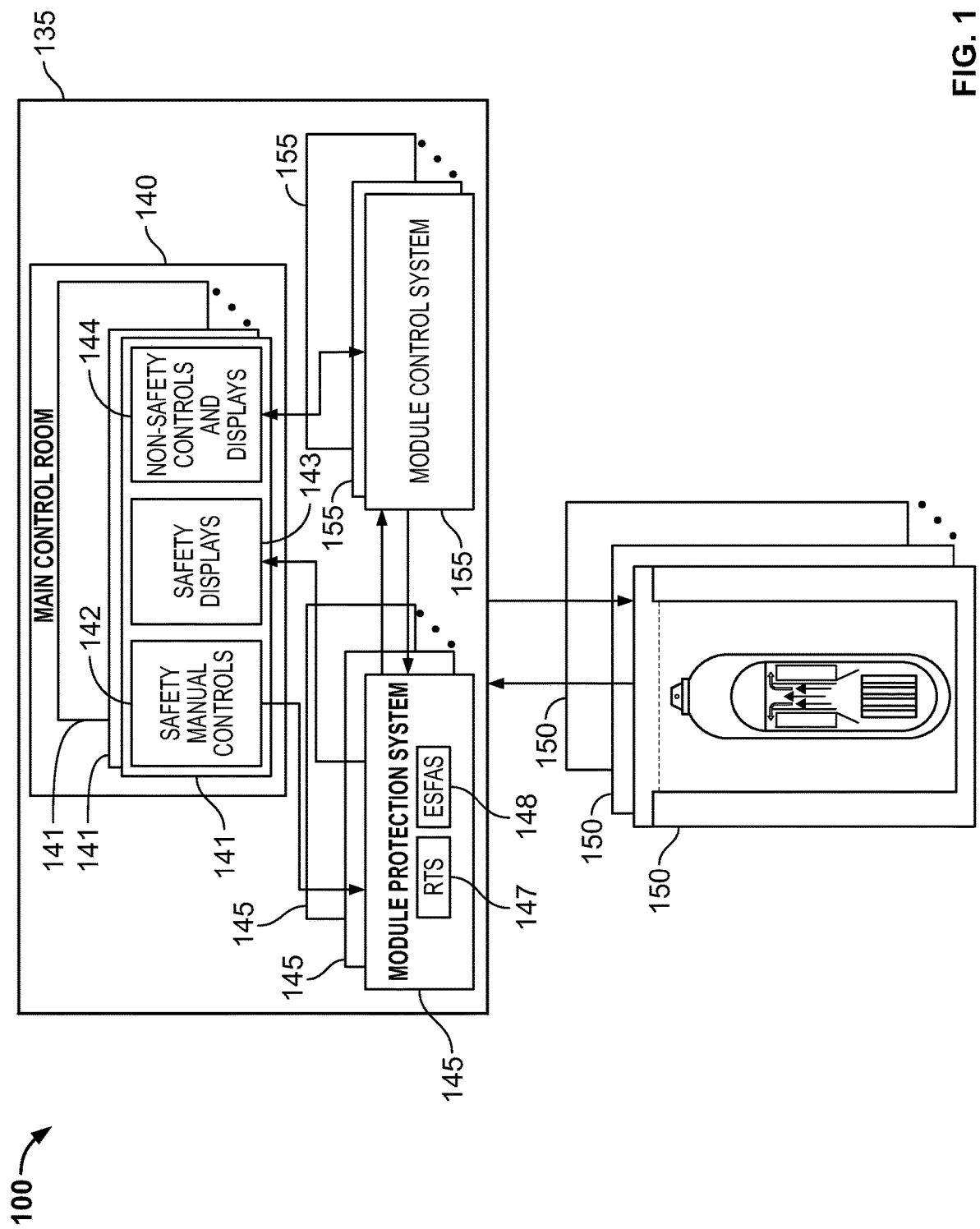
FIG. 1 illustrates a block diagram of an example implementation of a system that includes multiple nuclear power systems and an instrumentation & control (I&C) system.

FIG. 1 illustrates an example implementation of a system 100 that includes multiple nuclear power systems 150 and a nuclear instrumentation and control (I&C) system 135. Generally, the I&C system 135 provides automatic initiating signals, automatic and manual control signals, and monitoring and indication displays to prevent or mitigate the consequences of fault conditions in the system 100. The I&C system 135 provides normal reactor controls and protection against unsafe reactor operation of the nuclear power systems 150 during steady state and transient power operation. During normal operation, instrumentation measures various process parameters and transmits the signals to the control systems of I&C system 135. During abnormal operation and accident conditions, the instrumentation transmits signals to portions of the I&C system 135 (e.g., a reactor trip system (RTS) 147 and engineered safety features actuation system (ESFAS) 148 (e.g., for mitigating the effects of an accident) that are part of a module protection system (MPS) 145) to initiate protective actions based on predetermined set points.

In FIG. 1, the system 100 includes multiple nuclear power systems 150 that are electrically coupled to I&C system 135. Although only three nuclear power systems 150 are shown in this example, there may be fewer or more systems 150 that are included within or coupled to the system 100 (e.g., 6, 9, 12, or otherwise). In one preferred implementation, there may be twelve nuclear power systems 150 included within system 100, with one or more of the nuclear power systems 150 including a modular, light-water reactor as further described below.

With respect to each nuclear power system 150 and although not shown explicitly, a nuclear reactor core may provide heat, which is utilized to boil water either in a primary coolant loop (e.g., as in a boiling water reactor) or in a secondary cooling loop (e.g., as in a pressurized water reactor). Vaporized coolant, such as steam, may be used to drive one or more turbines that convert the thermal potential energy into electrical energy. After condensing, coolant is then returned to again remove more heat energy from the nuclear reactor core. Nuclear power system 150 is one example of any system which requires monitoring and protection functions in order to minimize the hazards associated with failures within the system.

In a specific example implementation of each nuclear reactor system 150, a reactor core is positioned at a bottom portion of a cylinder-shaped or capsule-shaped reactor vessel. Reactor core includes a quantity of fissile material that produces a controlled reaction that may occur over a period of perhaps several years or longer. Although not shown explicitly in FIG. 1, control rods may be employed to control the rate of fission within reactor core. Control rods may include silver, indium, cadmium, boron, cobalt, hafnium, dysprosium, gadolinium, samarium, erbium, and europium, or their alloys and compounds. However, these are merely a few of many possible control rod materials. In nuclear reactors designed with passive operating systems, the laws of physics are employed to ensure that safe operation of the nuclear reactor is maintained during normal operation or even in an emergency condition without operator intervention or supervision, at least for some predefined period of time.

In implementations, a cylinder-shaped or capsule-shaped containment vessel surrounds reactor vessel and is partially or completely submerged in a reactor pool, such as below a waterline, within a reactor bay. The volume between reactor vessel and containment vessel may be partially or completely evacuated to reduce heat transfer from reactor vessel to the reactor pool. However, in other implementations, the volume between reactor vessel and containment vessel may be at least partially filled with a gas and/or a liquid that increases heat transfer between the reactor and containment vessels. Containment vessel may rest on a skirt at the base of reactor bay.

In a particular implementation, reactor core is submerged within a liquid, such as water, which may include boron or other additive, which rises into channel after making contact with a surface of the reactor core. The coolant travels over the top of heat exchangers and is drawn downward by way of convection along the inner walls of reactor vessel thus allowing the coolant to impart heat to heat exchangers. After reaching a bottom portion of the reactor vessel, contact with reactor core results in heating the coolant, which again rises through channel.

Heat exchangers within the reactor vessel may represent any number of helical coils that wrap around at least a portion of the channel. In another implementation, a different number of helical coils may wrap around channel in an opposite direction, in which, for example, a first helical coil wraps helically in a counterclockwise direction, while a second helical coil wraps helically in a clockwise direction. However, nothing prevents the use of differently-configured and/or differently-oriented heat exchangers and implementations are not limited in this regard.

In FIG. 1, normal operation of the nuclear reactor module proceeds in a manner wherein heated coolant rises through the channel and makes contact with heat exchangers. After contacting heat exchangers, the coolant sinks towards the bottom of the reactor vessel in a manner that induces a thermal siphoning process. In the example of FIG. 1, coolant within the reactor vessel remains at a pressure above atmospheric pressure, thus allowing the coolant to maintain a high temperature without vaporizing (e.g., boiling).

As coolant within heat exchangers increases in temperature, the coolant may begin to boil. As the coolant within heat exchangers begins to boil, vaporized coolant, such as steam, may be used to drive one or more turbines that convert the thermal potential energy of steam into electrical energy. After condensing, coolant is returned to locations near the base of the heat exchangers.

During normal operation of the nuclear power system 150 of FIG. 1, various performance parameters of the nuclear power system may be monitored by way of sensors, e.g., of the I&C system 135, positioned at various locations within the nuclear power system 150. Sensors within the nuclear power system may measure system temperatures, system pressures, primary and/or secondary coolant levels, and neutron flux. Signals that represent these measurements may be reported external to the nuclear power system by way of communication channels to an interface panel of the I&C system 135.

The illustrated I&C system 135, generally, includes a main control room 140, a module (or reactor) protection system (MPS) 145, and a non-safety module control system (MCS) 155. The main control room 140 includes a set of controls and indicators 141 for each nuclear power system 150. Each set of controls and indicators 141 includes manual 1E controls 142, 1E indicators 143, and non 1E controls and indicators 144. In some aspects, "1E," may refer to regulatory requirements such as those that define a 1E scheme under IEEE Std. 308-2001, section 3.7, endorsed by Nuclear Regulatory Commission Regulatory Guide 1.32, which defines a safety classification of the electric equipment and systems that are essential to emergency reactor shutdown, containment isolation, reactor core cooling, and containment and reactor heat removal, or that are otherwise essential in preventing significant release of radioactive material into the environment. Typically, certain controls and indicators may be "1E" qualified (e.g., the manual 1E controls 142 and 1E indicators 143) while other controls and indicators may not be "1E" qualified (e.g., the non-1E controls and indicators 144).

The non-1E controls and indicators 144 is in bi-directional communication with the MCS 155. The MCS 155 may provide control and monitoring of the non-safety portions of the nuclear power system 150. Generally, the MCS 155 constrains operational transients, to prevent unit trip, and re-establish steady state unit operation, among other operations.

The MPS 145 is in one-way communication each with the manual 1E controls 142 and the 1E indicators 143 as shown in FIG. 1. The MPS 145, generally, initiates safety actions to mitigate consequences of design basis events. The MPS 145, generally, includes all equipment (including hardware, software, and firmware) from sensors to the final actuation devices (power sources, sensors, signal conditioners, initiation circuits, logic, bypasses, control boards, interconnections, and actuation devices) required to initiate reactor shutdown.

The MPS 145 includes the RTS 147 and the ESFAS 148. The RTS 147, in some aspects, includes four independent separation groups (e.g., a physical grouping of process channels with the same Class-1E electrical channel designation (A, B, C, or D)), which is provided with separate and independent power feeds and process instrumentation transmitters, and each of which groups is physically and electrically independent of the other groups) with independent measurement channels to monitor plant parameters that can be utilized to generate a reactor trip. Each measurement channel trips when the parameter exceeds a predetermined set point. The coincident logic of the RTS 147 may be designed so that no single failure can prevent a reactor trip when required, and no failure in a single measurement channel can generate an unnecessary reactor trip.

The ESFAS 148, in some aspects, includes four independent separation groups with independent measurement channels, which monitor plant parameters, that can be utilized to activate the operation of the engineered safety features (ESF) equipment. Each measurement channel trips when the parameter exceeds a predetermined set point. The ESFAS 148's coincident logic may be designed so that no single failure can prevent a safeguards actuation when required, and no single failure in a single measurement channel can generate an unnecessary safeguards actuation.

System 100 may include four echelons of defense, e.g., specific applications of the principle of defense-in-depth to the arrangement of instrumentation and control systems attached to a nuclear reactor for the purpose of operating the reactor or shutting it down and cooling it, as defined in NUREG/CR-6303. Specifically, the four echelons are a control system, a reactor trip or scram system, an ESFAS, and a monitoring and indicator system (e.g., the slowest and the most flexible echelon of defense that includes both Class 1E and non-Class 1E manual controls, monitors, and indicators required to operate equipment nominally assigned to the other three echelons).

The control system echelon, typically, includes MCS 155 (e.g., non-Class 1E manual or automatic control equipment), which routinely prevents reactor excursions toward unsafe regimes of operation and is generally used to operate the reactor in the safe power production operating region. Indicators, annunciators, and alarms may be included in the control echelon. Reactor control systems typically contain some equipment to satisfy particular rules and/or requirements, e.g., the requirement for a remote shutdown panel. The reactor control functions performed by the control system echelon are included in the MCS 155. The MCS 155, for instance, includes functions to maintain the system 100 within operating limits to avoid the need for reactor trip or ESF actuation.

The reactor trip system echelon, typically, includes the RTS 147, e.g., safety equipment designed to reduce reactor core reactivity rapidly in response to an uncontrolled excursion. This echelon typically consists of instrumentation for detecting potential or actual excursions, equipment and processes for rapidly and completely inserting the reactor control rods, and may also include certain chemical neutron moderation systems (e.g., boron injection). As illustrated, automatic reactor trip functions performed by the reactor trip echelon are included in the MPS 145 (e.g., in the RTS 147).

The ESFAS echelon, typically, includes the ESFAS module 148 that is part of the MPS 145. The ESFAS echelon, as implemented in the ESFAS module 148, typically includes safety equipment which removes heat or otherwise assists in maintaining the integrity of the three physical barriers to radioactive material release (e.g., nuclear fuel rod cladding, reactor vessel, and reactor containment). This echelon detects the need for and performs such functions as emergency reactor cooling, pressure relief or depressurization, isolation, and control of various support systems (e.g., emergency generators) or devices (valves, motors, pumps) required for ESF equipment to operate.

The monitoring and indicator system echelon, typically, includes the main control room 140, and, in some aspects, is the slowest and also the most flexible echelon of defense. Like the other three echelons, human operators (e.g., of system 100) are dependent upon accurate sensor information to perform their tasks, but, given information, time, and means, can perform previously unspecified logical computations to react to unexpected events. The monitoring and indication echelon includes Class 1E and non-Class 1E manual controls, monitors, and indicators required to operate equipment nominally assigned to the other three echelons (e.g., through the manual 1E controls 142, 1E indicators 143, and non-1E controls and indicators 144). The functions required by the monitoring and indicator system echelons are provided by the manual controls, displays, and indicators in the main control room, which includes information from the MCS 155 and MPS 145. The safety monitoring, manual reactor trip, and manual ESF actuation functions are included in the MPS 145. The MCS 155 provides non-safety monitoring and manual controls to maintain operating limits during normal plant operation.

In addition to including the four echelons of defense, system 100 includes multiple levels of diversity. Specifically, I&C diversity is a principle of measuring variables or providing actuation means, using different technology, logic or algorithms, to provide diverse ways of responding to postulated plant conditions. Here, diversity is applied to the principle in instrumentation systems of sensing different parameters, using different technologies, logic or algorithms, or means of actuation to provide several ways of detecting and responding to a significant event. Diversity is complementary to the principle of defense-in-depth and increases the chances that defenses at a particular level or depth will be actuated when needed. Generally, there are six attributes of diversity: human diversity, design diversity, software diversity, functional diversity, signal diversity, and equipment diversity. As discussed in more depth in the present disclosure, the MPS 145 may incorporate the six attributes of diversity in order to mitigate the effects of a common-cause failure (e.g., a failure caused by software errors or software-developed logic that could defeat the redundancy achieved by hardware architecture) in the MPS 145.

Generally, human diversity relates to addressing human-induced faults throughout the system development life-cycle (e.g., mistakes, misinterpretations, errors, configuration failures) and is characterized by dissimilarity in the execution of life-cycle processes.

Generally, design diversity is the use of different approaches, including software and hardware, to solve the same or a similar problem. Software diversity is a special case of design diversity and is mentioned separately because of its potential importance and its potential defects. The rationale for design diversity is that different designs have different failure modes and are not be susceptible to the same common influences.

Generally, software diversity is the use of different software programs designed and implemented by different software development groups with different key personnel to accomplish the same safety goals, for example, using two separately designed programs to determine when a reactor should be tripped.

Generally, functional diversity refers to two systems (e.g., sub-systems within system 100) that perform different physical or logical functions though they may have overlapping safety effects.

Generally, signal diversity is the use of different process parameters to initiate protective action, in which any of the parameters may independently indicate an abnormal condition, even if the other parameters fail to be detected correctly.

Generally, equipment diversity is the use of different equipment to perform similar safety functions (e.g., one of the processes or conditions essential to maintain plant parameters within acceptable limits established for a design basis event, which may be achieved by the RTS or the ESF completing all required protective actions or the auxiliary supporting features completing all required protective actions, or both). In this case, "different" may mean sufficiently unlike as to significantly decrease vulnerability to common cause failure.

In some aspects, the MPS 145 may incorporate a combination of continuous (or partially continuous) self-testing and periodic surveillance testing. Such a test strategy may ensure that all detectable failures are identified and announced to the station personnel (e.g., through the main control room 140). Self-test features may provide a comprehensive diagnostic system ensuring that a system status is continually (or partially) monitored. All detectable failures may be announced to station personnel, and an indication of the impact of the failure may be provided to determine the overall status of the system. The self-test features maintain separation group and division independence. The self-test features ensure system integrity is maintained at all times.

In some aspects, each sub module within the MPS 145 (described in more detail below) may contain self-test features providing high fault detection coverage designed to detect single failures within the module. This may minimize the time required to detect faults, providing a benefit to safety and system availability. While the system is in normal operation, the self-tests run without affecting the performance of the safety function, such as response time.

The self-test features may be capable of detecting most faults in both active and inactive logic (e.g., logic that is activated only when a safety function is required to operate) to avoid having an undetected fault. Fault detection and indication occurs at the MPS sub module level, enabling plant personnel to easily identify the MPS sub module that needs to be replaced.

Periodic on-line surveillance testing capability may be incorporated to ensure all functional tests and checks, calibration verification, and time response measurements are validated. The periodic surveillance testing also verifies the continual self-testing functions.

The self-test and periodic surveillance testing features in the MPS 145 may be designed for in-service testability commensurate with the safety functions to be performed for all plant operating modes. The performance self-testing and surveillance testing does not require any makeshift test setups. The testing features may be inherent to the design of the system and add minimal complexity to the safety function logic and data structures. Continual indication of a bypass condition is made if: (1) a fault is detected by self-testing during normal operation of the plant, or (2) some part of a safety function is bypassed or deliberately rendered inoperable for testing. Once the bypass condition is removed, the indication of the bypass is removed. This may ensure that plant personnel can confirm that a bypassed safety function has been properly returned to service.

Diagnostics data for the MPS 145 are provided to a maintenance workstation (MWS) for each separation group and division. The MWS may be located close to the equipment to facilitate troubleshooting activities. The interface between the MPS and the MWS may be an optically-isolated, one-way diagnostic interface. All diagnostics data may be communicated via a physically separate communications path, ensuring that diagnostics functionality is independent of safety functionality. Additionally, the diagnostics data may be transmitted to a central historian for long-term storage. This provides a means of performing an historical analysis of the system operation.

The diagnostic system may maintain a list of installed modules. The lists may be continually compared to the installed modules that are active in the system to guard against a missing module or an incorrect module being installed.

All MPS safety data communications may be designed with error detection to enhance data integrity. The protocol features ensure communications are robust and reliable with the ability to detect transmission faults. Similar data integrity features may be used to transfer diagnostics data.

Figure 2A:
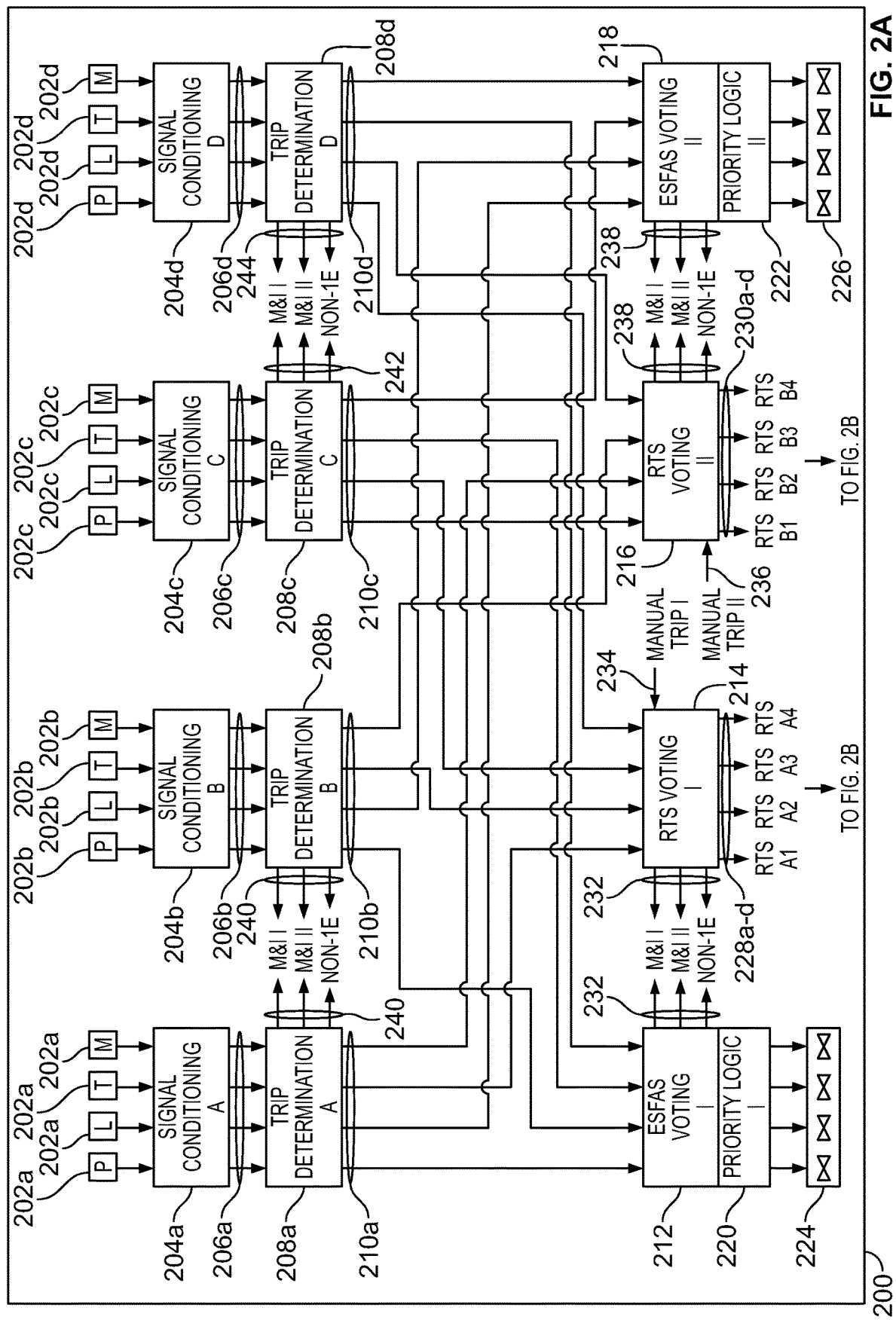
FIGS. 2A-2B illustrate a block diagram of module protection system (MPS) of an I&C system for a nuclear power system.
Figure 2B:
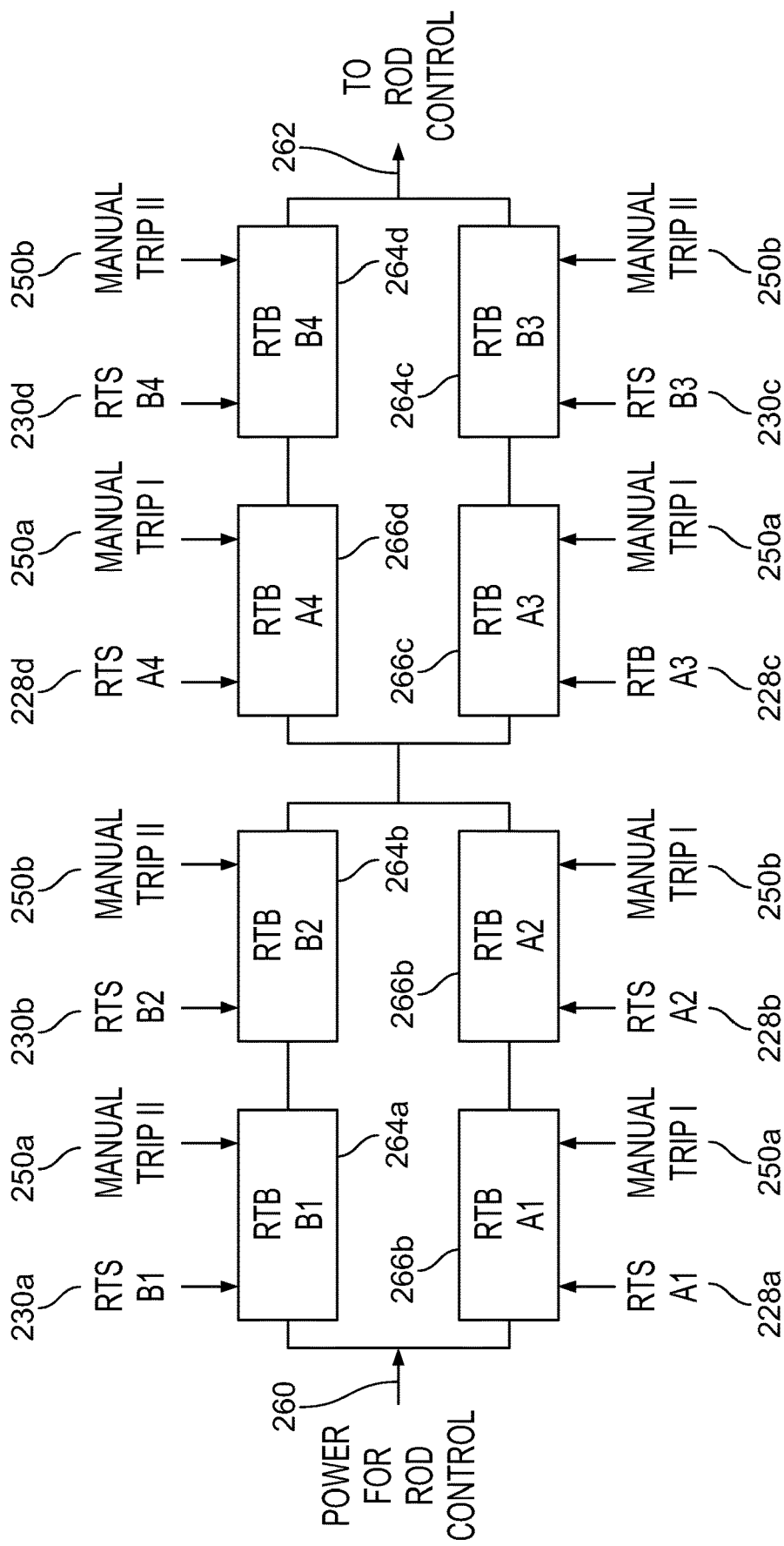

FIGS. 2A-2B illustrate a block diagram of module protection system (MPS) 200 of an I&C system for a nuclear power system 150. In some implementations, the MPS 200 may be similar or identical to the MPS 145 shown in FIG. 1. Generally, the illustrated MPS 200 includes four separation groups of sensors and detectors (e.g., sensors 202a-202d); four separation groups of signal conditioning and signal conditioners (e.g., signal conditioners 204a-204d); four separation groups of trip determination (e.g., trip determinations 208a-208d); two divisions of RTS voting and reactor trip breakers (e.g., division I RTS voting 214, and division II RTS voting 216); and two divisions of engineered safety features actuation system (ESFAS) voting and engineered safety features (ESF) equipment (e.g., division I ESFAS voting 212 and ESF equipment 224, and division II ESFAS voting 218 and ESF equipment 226).

Generally, the sensors 202a-202d include process sensors that are responsible for measuring different process parameters such as pressure, temperature, level, and neutron flux. Thus, each process parameter of the nuclear power system 150 is measured using different sensors, and is processed by different algorithms, which are executed by different logic engines. In some aspects, neutron flux sensors are responsible for measuring neutron flux from a reactor core from a shutdown condition up to 120 percent of full power. Three types of neutron flux detectors may be used in the MPS 200, including source range, intermediate range, and power range Generally, the signal conditioners 204a-204d receive the measurements from the sensors 202a-202d, process the measurements and provide outputs 206a-206d. In some aspects, the interconnections of the sensors 202a-202d to the signal conditioners 204a-204d may be dedicated copper wires or some other signal transmission method.

Figure 3A:
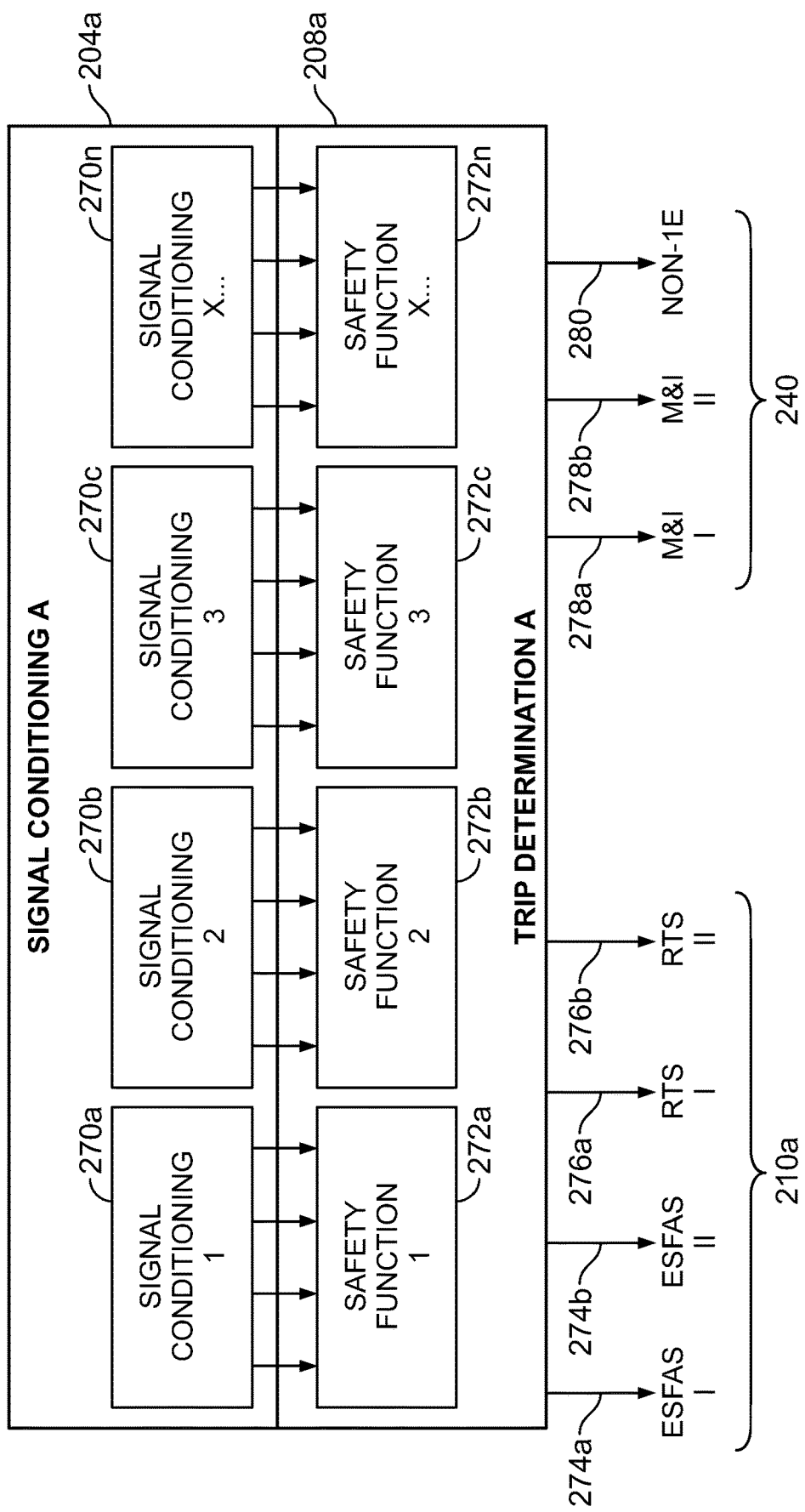
FIG. 3A illustrates a block diagram of a trip determination block of an MPS of an I&C system for a nuclear power system.

The signal conditioners 204a-204d each may be comprised of multiple input modules 270a-270n (e.g., indicating any number of modules depending on the number of sensor inputs), as shown in FIG. 3A, that are responsible for conditioning, measuring, filtering, and sampling field inputs from the sensors 202a-202d. Each input module 270a-270n may be dedicated to a specific input type, such as 24 V or 48 V digital inputs, 4-20 mA analog inputs, 0-10 V analog inputs, resistance thermal detector inputs, or thermo-couple inputs.

Each input module 270a-270n may be comprised of an analog circuit and a digital circuit. The analog circuit is responsible for converting analog voltages or currents into a digital representation. It is also referred to as signal conditioning circuitry. The digital portion of each input module 270a-270n may be located within a logic engine. The logic engine performs all input module control, sample and hold filtering, integrity checks, self-testing, and digital filtering functions. The digital representation of the sensor output is communicated from the signal conditioners 204a-204d to the trip determination 208a-208d through the outputs 206a-206d using, in some examples, a serial interface.

With reference to FIG. 3A as well, the trip determinations 208a-208d, generally, receive sensor input values in a digital format via a serial interface from the signal conditioners 204a-204d as described above. The trip determinations 208a-208d are each comprised of independent safety function modules (SFM) 272a-272n (described more fully with reference to FIG. 5), where a specific module implements one set of safety functions (e.g., a set may be a single safety function or multiple safety functions related to a particular process parameter). For example, a set of safety functions may consist of a group of functions related to a primary variable, such as a high and low trip from the same pressure input. Each SFM 272a-272n contains a unique logic engine dedicated to implementing one set of safety functions. This results in a gate level implementation of each set of safety functions being entirely different from all other sets of safety functions.

The sensor input values (e.g., outputs 206a-206d) may be communicated via a deterministic path and are provided to a specific SFM 272a-272n in each trip determination 208a-208d. These input values may then be converted to engineering units to determine what safety function, or a set of safety functions, is implemented on that specific SFM 272a-272n. The trip determinations 208a-208d provide these engineering unit values to the control system via, in some examples, an isolated, transmit only, fiber optic connection.

The SFMs in each trip determination 208a-208d make a reactor trip determination based, if required, on a predetermined set point, and provides a trip or no-trip demand signal to each RTS division (e.g., the RTS voting 214 and 216 in divisions I and II, respectively) via isolated, and in some cases triple-redundant, transmit only, serial connections. The SFMs also make an ESFAS actuation determination, if required, based on a predetermined set point, and provides an actuate or do-not-actuate demand signal to each ESFAS division (e.g., the ESFAS voting 212 and 218 in divisions I and II, respectively) via isolated, in some cases, triple-redundant, transmit only, serial connections.

Figure 3B:
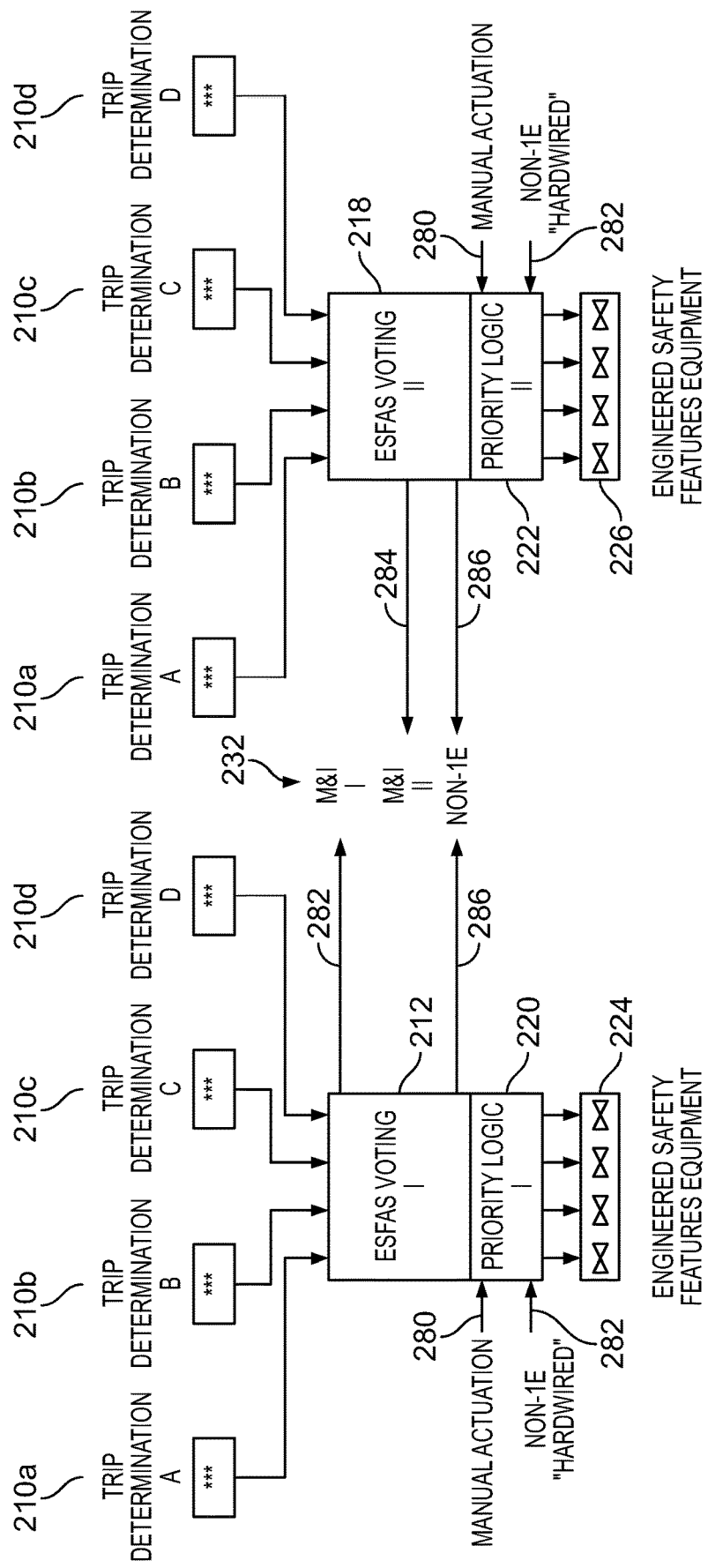
FIG. 3B illustrates a block diagram of an engineered safety features actuation system (ESFAS) of an MPS of an I&C system for a nuclear power system.

As shown in FIGS. 3A-3B, for instance, a particular trip determination 208a provides a trip or no-trip demand signal to ESFAS voting 212 through output 274a and to ESFAS voting 218 through output 274b. The trip determination 208a provides a trip or no-trip demand signal to RTS voting 214 through output 276a and to RTS voting 216 through output 276b. These outputs are also generally shown in FIG. 2A as outputs 210a-210d from the trip determinations 208a-208d, respectively.

As further shown in FIG. 3A, for instance, a particular trip determination 208a provides a trip or no-trip demand signal to monitoring & indication (M&I) outputs 278a and 278b (one per division), as well as to a non-1E output 280. Outputs 278a and 278b provide process information to the MCS for non-safety control functions. Output 280 provides process information and trip status information to the non-1E controls and indicators 144.

Returning to FIG. 2A, each RTS division (e.g., RTS voting 214 for division I and RTS voting 216 for division II) receives inputs from the trip determinations 208a-208d as described above via isolated, and in some aspects redundant (e.g., double, triple, or otherwise), receive only, serial connections 210a-210d. The trip inputs are combined in the RTS voting logic so that two or more reactor trip inputs from the trip determinations 208a-208d produce an automatic reactor trip output signal on outputs 228a-228d and 230a-230d (as appropriate for each division) that actuates the trip coils for four of the eight reactor trip breakers (RTB) (shown in FIG. 2B) associated with the respective division. In other words, the RTS voting logic, in this example implementation of the MPS 200, work on a "2 out of 4" logic, meaning that if at least two of the four trip determinations 208a-208d indicate that a reactor "trip" is necessary, then a trip signal is sent to the each of the RTB 264a-264d and 266a-266d. This breaker configuration permits safe and simple on-line testing of the MPS 200.

A manual trip 250a provides a direct trip of the RTB 266a-266d (for division I) and manual trip 250b provides a direct trip of the RTB 264a-264d (for division II) as well as input to the automatic actuation, manual trip 234 (for division I) and manual trip 236 (for division II) to ensure the sequence is maintained.

As further illustrated, each RTB 264a-264d and each RTB 266a-266d includes, as an input, a manual trip 250a or 250b. Thus, if both manual trips 250a and 250b are initiated (e.g., each manual trip for divisions I and II), then power input 260 will not be transmitted to power output 262 regardless of the status (e.g., trip or no-trip) of the inputs 230a-230d and inputs 228a-228d).

ESFAS voting and logic are arranged, in the example implementation, so that no single failure can prevent a safeguards actuation when required, and no single failure in a trip determination signal (e.g., 210a-210d) can generate an unnecessary safeguards actuation. The ESFAS system may provide both automatic and manual initiation of critical systems, such as the emergency core cooling system and the decay heat removal system.

Each ESFAS voting 212/218 receives inputs 210a-210d from the trip determinations 208a-208d via isolated, triple-redundant, receipt only, fiber optic (or other communication technique) connections. Actuation logic and voting occur within the ESFAS voting 212/218. When the ESFAS voting 212/218 determine an actuation is required, the ESFAS voting 212/218 sends an actuation demand signal to ESFAS priority logic 220/222, respectively, which actuates appropriate ESF equipment 224 and 226.

The illustrated implementation of the MPS 200 in FIGS. 2A-2B and 3A-3B ensures a high level of independence between the key elements. This includes independence between the four separation groups of sensors and detectors 202a-202d, the four separation groups of trip determination (labeled "a" through "d"), the two divisions of RTS 214/216 (division I and division II as described), the two divisions of the ESFAS circuitry 212/218 (division I and division II as described), and the two divisions of the ESF equipment 224/226 (division I and division II as described). Based on inputs to an SFM (e.g., in the trip determinations 208a-208d), the MPS 200 implements a set of safety functions independently within each of the four separation groups. Safety function independence is maintained from the sensors 202a-202d to the trip determination output 210a-210d. This configuration, in some aspects, limits SFM failures to those based on that module's inputs. This strategy may help limit the effects of a common-cause failure and enhance signal diversity. This method of independence may also ensure a failure within independent safety functions does not propagate to any of the other safety functions modules. Further, on-line replacement of a failed SFM ensures that the failure can be corrected with minimal, if any, impact to other modules.

Communication of safety function data within the illustrated MPS 200 is transmitted or received via triple module, redundant, independent, optically isolated, one-way communication paths. This communication scheme may ensure that, apart from interdivisional voting, a safety function is not dependent on any information or resource originating outside its division to accomplish its safety function. Fault propagation between Class 1E divisions (e.g., divisions I and II) is prevented by one-way isolation (e.g., optical isolation or otherwise) of the divisional trip signals.

The illustrated implementation of the MPS 200 in FIGS. 2A-2B and 3A-3B further incorporates redundancy in multiple areas of the illustrated architecture. The redundancy within the MPS 200 includes four separation groups of sensors and detectors (labeled "a" through "d"), trip determination (labeled "a" through "d"), and two divisions of RTS and ESFAS circuitry (division I and division II as described). The MPS 200 also uses two-out-of-four voting so that a single failure of an initiation signal will not prevent a reactor trip or ESF equipment actuation from occurring when required. Additionally, a single failure of an initiation signal will not cause spurious or inadvertent reactor trips or ESF equipment actuations when they are not required.

The MPS 200 also incorporates functional independence by implementing each set of safety functions, which is used to mitigate a particular transient event on an independent SFM with a unique logic engine for that particular set of safety functions.

In some aspects, the MPS 200 implements design techniques to realize a simple, highly reliable, and safe design for a nuclear reactor system. For example, the MPS 200 may be based on a symmetrical architecture of four separation groups and two divisions. Each of the four separation groups may be functionally equivalent to the others, and each of the two divisions may be functionally equivalent. As described above, two-out-of-four voting may be the only voting strategy in the illustrated implementation. As another example, logic of the MPS 200 may be implemented in finite-state machines (e.g., a collection of digital logic circuits that can be in one of a finite number of states, and is in only one state at a time, called the current state, but may change from one state to another when initiated by a triggering event or set of conditions, such as a state transition) dedicated to a particular safety function or group of safety functions. Thus, no kernel or operating system is required. As another example, communications within the MPS 200 may be based on deterministic protocols, and all safety data are communicated via redundant communication paths. As another example, diversity attributes of the MPS 200 may be designed to be inherent to the architecture without the additional complexities of additional systems based on completely different platforms.

For instance, FIGS. 4A-4B illustrate example charts 400 and 450, respectively, that illustrate how the multi-layered diversity strategy implemented within MPS 200 mitigates software- or software-logic based common-cause failures. Charts 400 and 450 illustrate how a multi-layered diversity strategy implemented within MPS 200 can eliminate a concern for software-based or software logic-based CCF within the MPS (e.g., MPS 200). In these examples, the transient event is a loss of feedwater for a nuclear power system. As illustrated, two different process parameters, A1 and A2, are measured (e.g., through sensors 202a-202d). A1, as illustrated, is a temperature parameter while A2, as illustrated, is a pressure.

The different process measurements, A1 and A2, are input into two different safety function algorithms: (A1) High Temperature and (A2) High Pressure, as illustrated. Each of the two safety function algorithms are located on an separate and independent SFM within a separation group. The safety function algorithms may be implemented using two different sets of programmable digital hardware (A/C and B/D) divided into four separation groups (A, B, C, D) and two divisions, as is shown with MPS 200. For example, here, the two safety functions comprise a single set of safety functions. Each set (e.g., of two safety function algorithms) may be based on different technology.

Design diversity is also incorporated by process as each set of programmable digital hardware may be designed by different design teams using different sets of design tools. As one example, the safety function(s) may be implemented in a microprocessor. In this example, the safety function(s) may be evaluated in a sequential manner that, in some aspects, may introduce a dependency of one safety function (A2 for instance) on another safety function (A1 for instance) due to the sequential operation of the processing loop. As another example, the safety functions may be implemented in a state-based field programmable gate array (FPGA). In this example, each safety function may be evaluated independently of every other safety function. This latter example may ensure an increased independence by removing any dependence of the processing of one safety function on another safety function.

The multi-layered diversity for the loss of feedwater transient event example provides protection against a CCF defeating the protective action by limiting the software CCF to one set (A/C) of a particular safety function (A1). In some aspects, the software CCF is limited to a particular safety function based on the functional independence between the two safety functions and the process measurements that the safety function algorithms use as inputs. In some aspects, the software CCF is limited to one set of a particular safety function by incorporating different programmable hardware, design teams, and design tools for each set. With the CCF limited to one set of a particular safety function, the transient event is mitigated by the other set (B/D) of that safety function (A1) or both sets (A/C and B/D) of the second safety function (A2).

For example, as shown in FIG. 4A, an output of the safety function for A1 that indicates that protective action needs to be taken by all four separation groups (A, B, C, D) (e.g., shown by the check marks) results in an initiation of protective action (e.g., as shown by the "Trip"). As shown in FIG. 4B, if there is a CCF in two separation groups (A and C), even two groups in a single division, for safety function A1, positive indications of a protective action in the other separation groups (B and D) still provide for sufficient votes (in a two-out-of-four scheme as described above) to initiate the protective action. Further, the CCFs in groups A and C for safety function A1 do not propagate to safety function A2 because of the independent evaluation on each SFM.

Figure 5:
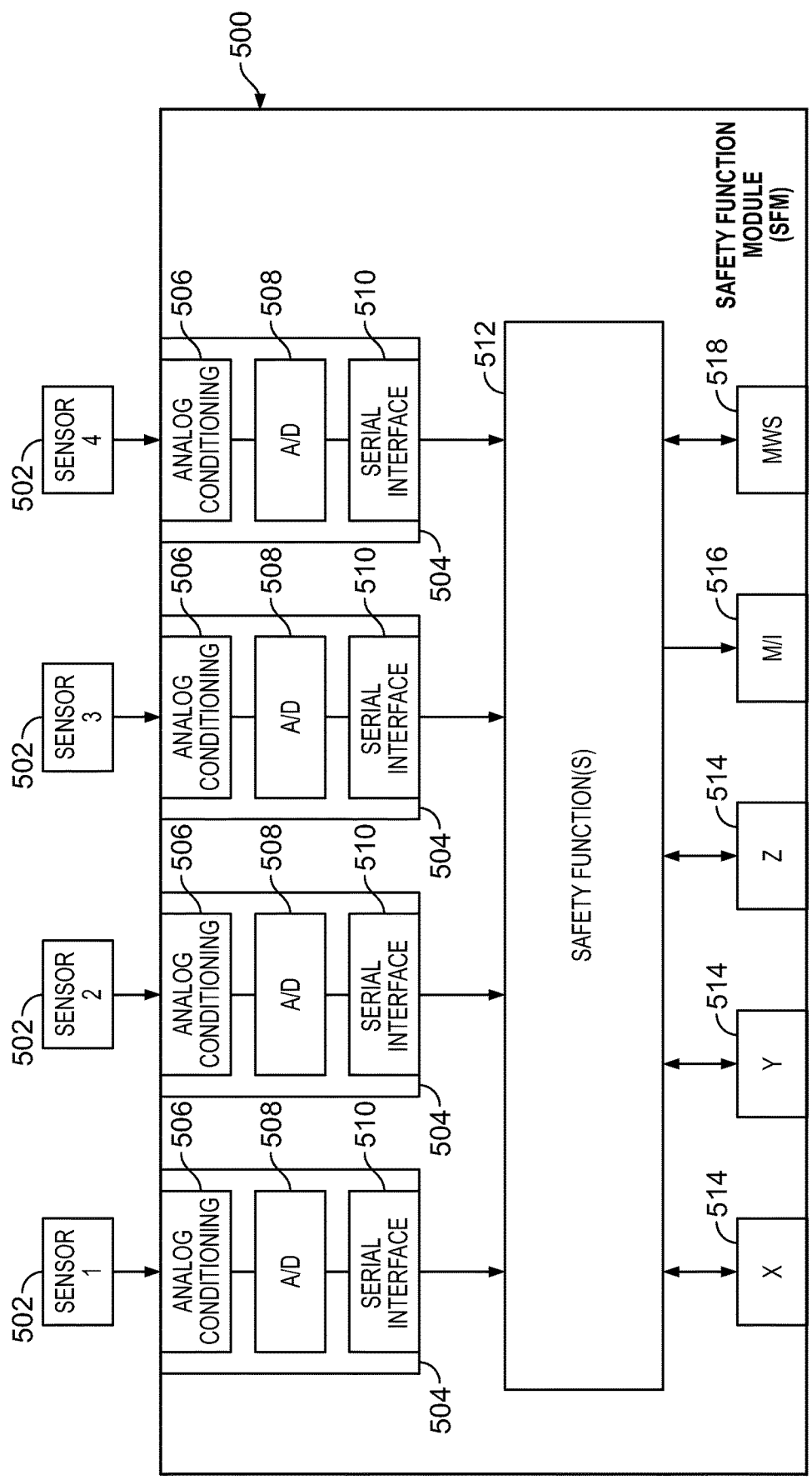
FIG. 5 illustrates a block diagram of a safety function module (SFM) of an MPS of an I&C system for a nuclear power system.
Figure 6:
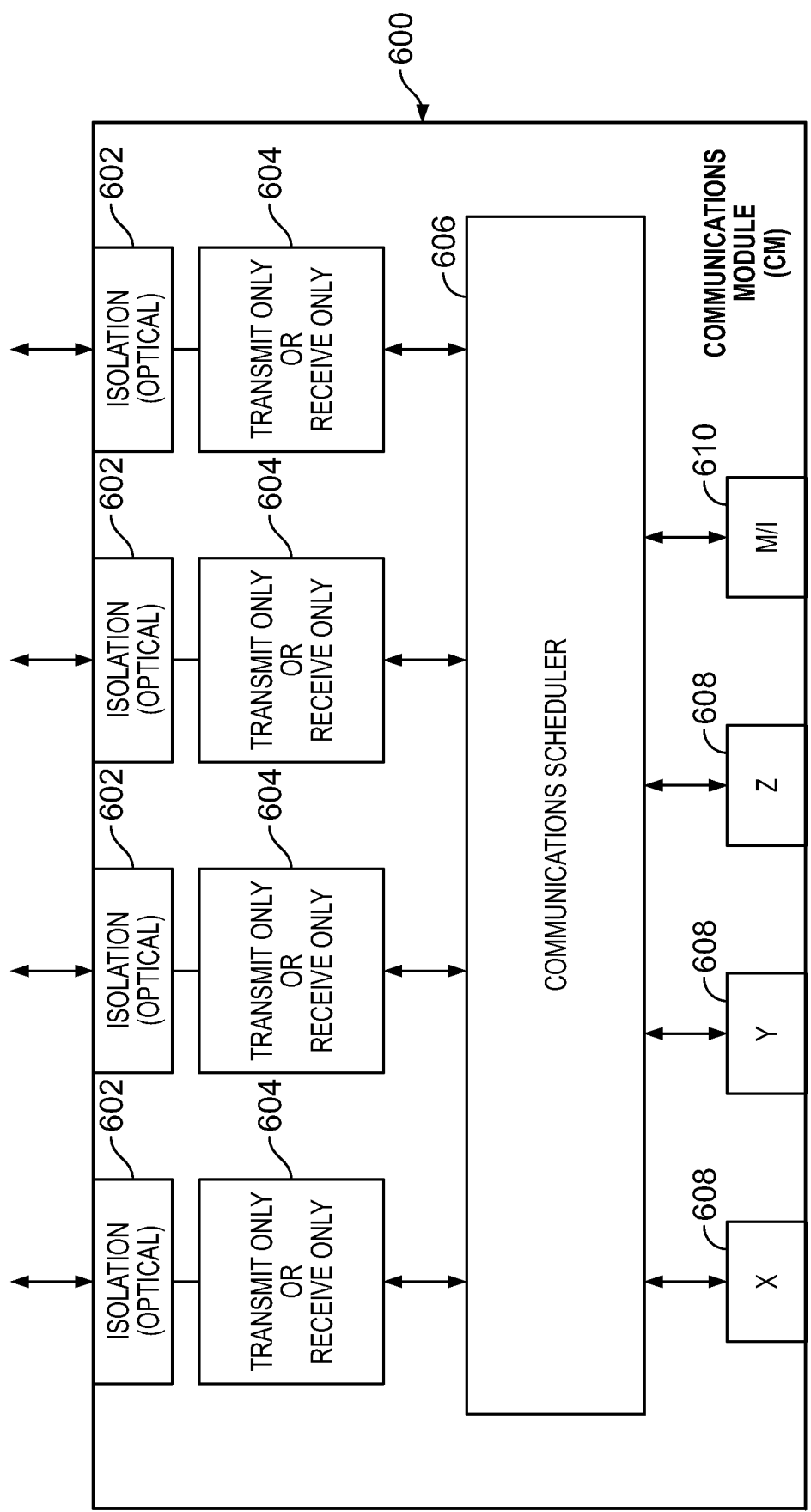
FIG. 6 illustrates a block diagram of a communications module (CM) of an MPS of an I&C system for a nuclear power system.
Figure 7:
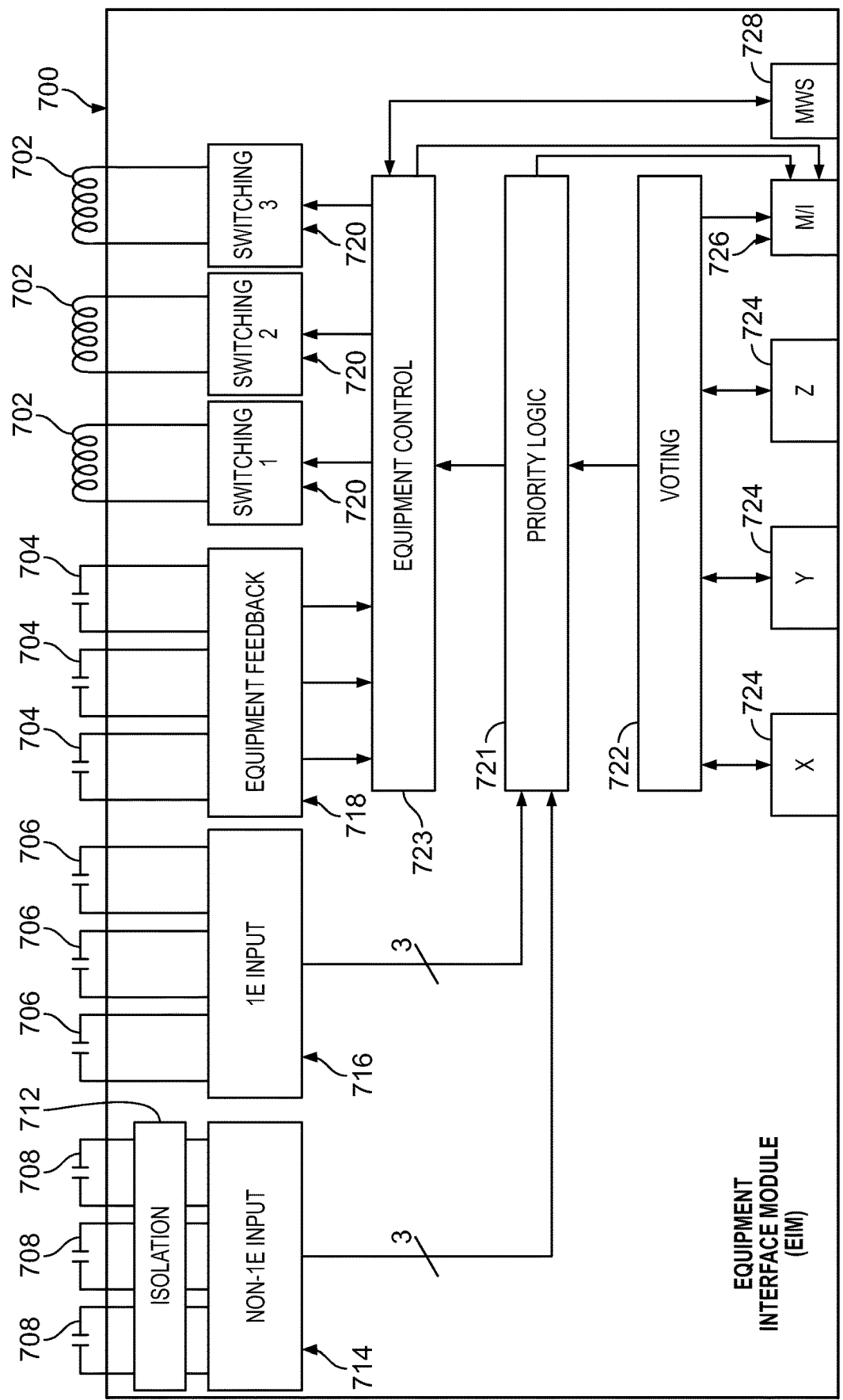
FIG. 7 illustrates a block diagram of an equipment interface module (EIM) of an MPS of an I&C system for a nuclear power system.
Figure 8:
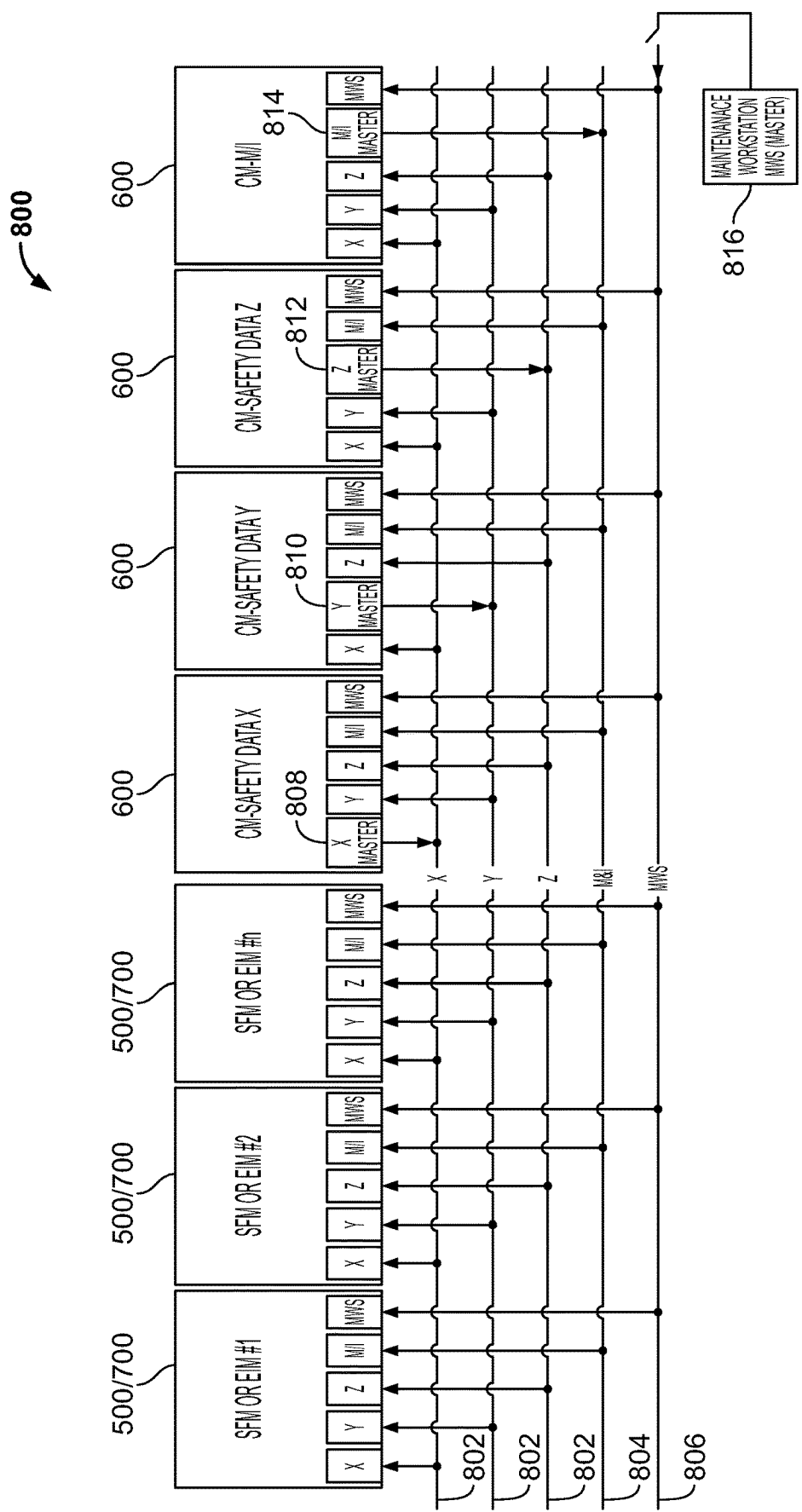
FIG. 8 illustrates an example embodiment of a chassis of a reactor protection system that communicably couple one or more SFM, EIM, and CM.

FIG. 5 illustrates a block diagram of a safety function module (SFM) 500 of an MPS of an I&C system for a nuclear power system. FIG. 6 illustrates a block diagram of a communications module (CM) 600 of an MPS of an I&C system for a nuclear power system. FIG. 7 illustrates a block diagram of an equipment interface module (EIM) 700 of an MPS of an I&C system for a nuclear power system. FIG. 8 (discussed below) illustrates the communications paths within a chassis (e.g., a mechanical structure that interconnects one or more SFM 500, CM 600, and EIM 700). Generally, the illustrated modules 500, 600, and 700, interconnected within a chassis (as illustrated with chassis 800 and as described below), implement the safety functions of the MPS 200 and make up the separation group level modules (e.g., signal conditioners 204a-204d, trip determinations 208a-208d), the RTS level modules (e.g., RTS voting 214/216), and the ESFAS level modules (e.g., ESFAS voting 212/218). In some aspects, having three types of modules (500, 600, and 700) may minimize the number of line replaceable units, thereby minimizing obsolescence. Further, these modules (500, 600, and 700) may be functionally independent so that a single failure in any individual module (500, 600, and 700) does not propagate to other modules or other safety functions. Further, the combinations of modules (500, 600, and 700) as implemented in FIGS. 8A-8C may provide for discrete, deterministic safety signal paths.

In some aspects, the modules (500, 600, and 700) may have one or more characteristics that defines, at least in part, their functional independence. For example, each of the modules may be fully autonomous relative to each other module in an overall system/architecture (e.g., in the MPS 200). As another example, each of the modules may perform a particular, intended safety function autonomously relative to each other module in the overall system/architecture. As yet another example, each of the modules may include dedicated logic, which is specific to the particular, intended safety function of the module. Each functionally independent module may not, therefore, be dependent on logic or functionality from any other module to complete the particular, intended safety function.

Turning to FIG. 5, the SFM 500, as illustrated, processes sensor inputs or data from other SFMs to make reactor trip and/or ESF actuation determinations for the separation group to which the particular SFM is assigned (e.g., separation group A, B, C, or D). An SFM 500 can be used in two separate configurations: (1) sensor signal conditioning with safety data bus communication, and reactor trip and/or ESF actuation; and (2) safety data bus communication with reactor trip determination and/or ESF actuation determination.

As illustrated, the SFM 500 generally includes an input block 504, a functional logic block 512, and communication blocks 514, 516 and 518. Each input block 504 (four shown in FIG. 5) consists of a signal conditioning circuit 506, analog-to-digital (A/D) converter 508, and a serial interface 510. Each input block 504 is communicably coupled to a sensor 502 (e.g., that may be the same or similar to the sensors 202a-202d). As shown, an individual SFM 500 can handle up to four input blocks 504 (in the illustrated example embodiment). The input type can be any combination of analog and digital (e.g. 4-20 mA, 10-50 mA, 0-10 V) that the SFM 500 would need to make a trip or ESF actuation determination, including the generation of permissives and interlocks.

The functional logic block 512 is a programmable portion of the SFM 500 that converts an output from the serial interface 510 of an input block 504 (if used) into engineering units. The functional logic block 512 may also makes a trip and/or ESF actuation determination based on the output of the input block 504 (e.g., based on sensor measurement from sensor 502) and/or information from safety data buses. The functional logic block 512 may also generate permissives and control interlocks. As illustrated, the functional logic block 512 consists of multiple deterministic logic engines that utilize the input blocks 504 and/or information obtained from safety data buses to make a trip or ESF actuation determination.

Setpoint and other tunable information utilized by the functional logic block 512 may be stored in non-volatile memory (e.g., on the SFM 500). This may allow for changes without modifying underlying logic. Further, to implement functional, signal and software diversity, a primary and backup function used to mitigate an AOO or PA may not be on the same SFM 500. Thus, by using a dedicated SFM 500 for a function or group of functions and by ensuring primary and backup functions are on separate modules 500, the effect of a software CCF is limited due to the unique logic and algorithm on each module 500.

The communication blocks 514/516/518 consists of five separate communication ports (e.g., three safety data ports labeled 514, one port labeled 516, and one port labeled 518). Each port may be functionally independent and is designated as either a Monitoring and Indication (M/I) Bus (e.g., block 516), Maintenance Workstation (MWS) Bus (e.g., block 518), or a Safety Bus (e.g., blocks 514). Although each safety data bus 514 may communicate the same data, each communication port is asynchronous and the port packages and transmits data differently by using different independent and unique communications engines. For example, one safety data bus 514 may transmit, for example, 10 packets of data in sequential order (e.g., 1, 2, . . . , 10) while another safety bus 514 transmits the same 10 packets in reverse order (e.g., 10, 9, . . . , 1) and a third safety bus 514 transmits even packets first followed by odd packets (e.g., 2, 4, . . . 10, 1, 3, . . . , 9). This triple module redundancy and diversity not only allows for communication error detection but limits a communication CCF to a particular bus without affecting the ability of RTS or ESFAS to make a correct trip and/or actuation determination.

Turning to FIG. 6, the CM 600 provides independent and redundant communication between other modules of the MPS, such as SFMs 500 and EIMs 700, within separation group-level interconnects, RTS-level interconnects, and ESFAS-level interconnects of an MPS of an I&C system for a nuclear power system (e.g., MPS 200). For example, the CM 600 may be a pipeline for data to be passed within the MPS, as well as a scheduler of such passage of data. The CM 600, in any particular channel, may control the operations/passage of data within that channel. In the illustrated implementation of the CM 600, there are three types of blocks: restricted communication blocks (RCB) 604, a communication scheduler 606, and communication blocks 608/610.

An RCB 604, as illustrated, consists of four communication ports. In some aspects, each port can be configured to a different unidirectional path (e.g., receive only or transmit only). In some implementations, as in the illustrated CM 600, information received or sent from a particular RCB 604 is passed through an optic isolator 602. In some cases, the optic isolator 602 may help ensure that data from any particular trip determination is isolated from the data of the other trip determinations, thereby ensuring independent redundancy.

The communication scheduler 606 is responsible for moving data from/to the communication blocks 608/610 to/from the RCB 604. In some aspects, the communications engine 606 consists of programmable logic, such as an FPGA, a microprocessor, or other discrete logic programmed to schedule communication amongst the described interconnects.

The communication blocks 608/610 consist of four separate communication ports (e.g., three safety data ports labeled 608 and one port labeled 610). Each port may be functionally independent and is designated as a Monitoring and Indication (M/I) Bus (e.g., block 610) or a Safety Data Bus (e.g., blocks 608). In some aspects, an M/I bus 610 may gather information from all modules in the MPS (e.g., modules 500, 600, and 700), including a condition of each of such modules, and sends that information to a "historian" station (e.g., dedicated computing system for historical data of the MPS).

Although each safety data bus 608 may communicate the same data, each communication port packages and transmits data differently, as described above with reference to busses 514. Depending on the application of the communications module, the four communication blocks 608/610 can be configured in any combination of uni- and bidirectional paths.

Turning to FIG. 7, the EIM 700, generally, provides an interface to each component within the nuclear power system within the RTS and/or ESFAS level systems, in order for trip determinations to be voted on and component-level actuations and manipulations to be made. As illustrated, the EIM 700 includes output blocks 720, an equipment feedback block 718, a 1E manual input 716, a non-1E manual input 714, a voting engine 722, a priority logic block 721, an equipment control block 723, and communication blocks 724/726/728. Generally, the EIM 700 may perform voting, and in some cases double voting (e.g., two out of three voting for communication and two out of four voting for trip signals), based on trip signals to ensure that failures of a single component do not propagate within channel-level interconnects, RTS-level interconnects, and ESFAS-level interconnects of an MPS of an I&C system for a nuclear power system (e.g., MPS 200). The EIM 700 may perform a priority assignment for the automatic signal from the voting 722, manual actuation/1E input 716, and non-1E input 714.

The output blocks 720, include, as illustrated, up to three independent output switches, or more in some examples, that can be used in external circuits and are coupled to electrical loads 702 (e.g., actuators). In some aspects, this allows for the EIM 700 to control a single component directly or provide an initiation signal for multiple components. For example, an output block 720 energizes a relay that starts various pumps and opens multiple valves. Each output block 720 may also include the capability to self-test and perform load continuity checks.

The equipment feedback block 718, as shown, may consist of multiple (e.g., up to three or more in some examples) feedback inputs 704 from equipment. The feedback inputs 704 can include, for example, valve position (e.g., fully open, fully-closed), breaker status (e.g., closed/open), or other feedback from other components. The equipment feedback 704 may be utilized in the voting equipment control block 723 discussed below.

The 1E manual input block 716 may provide multiple (e.g., up to two or more in some examples) manual input signals 706. This portion of the EIM 700 may be dedicated to manual inputs and is utilized in the priority logic block 721.

The multiple input signals 708 are coupled to the non-1E input block 714 via an isolation interface 712. This electrical isolation interface 712 allows the use of non-1E signals for input to the priority logic block 721.

The voting engine 722 receives the trip determination inputs from the communications blocks 724. The result of the voting provides an actuation or no actuation signal to the priority logic block 721 for an automatic actuation signal. In some aspects, the voting engine 722 may implement a voting scheme, and in some cases, a double voting scheme, to ensure that failures of a single component within the MPS do not propagate. For example, in some aspects, the voting engine 722 receives trip determinations at the communications blocks 724. Each communication block 724 may receive a trip determination (e.g., trip or no trip) from four channels or separation groups (e.g., channels A-D described above). Within the voting engine 722, in some aspects, there may be three "A" trip determinations, three "B" trip determinations, three "C" trip determinations, and three "D" trip determinations. The voting engine 722 may thus perform a two out of three determination on each of the four channels or separation groups. If at least two of three "A" channels provide a valid communication of a trip (e.g., indicate that communication of a trip determination is valid), for example, then the voting engine 722 may communicate, at least initially, that there is a trip on channel "A," while if only one of the three "A" channels indicate a trip, then the voting engine 722 may determine that there is no trip on channel "A."

The voting engine 722, as noted above, may implement a double voting scheme to further ensure that failures are not propagated throughout the MPS structure. For example, subsequent to the two out of three communication determination described above, the voting engine 722 may also perform a two out of four trip determination in order to determine whether a trip has actually occurred (e.g., as opposed to a failure indicating a false trip). For example, outputs of the four voting blocks (e.g., two of three voting logical gates) in the voting engine 722 that perform the two of three determination may be fed to another voting block (e.g., two of four voting logical gate) that makes the two of four determination. If at least two of the four outputs from the first tier voting blocks (e.g., the two of three blocks) indicate a trip, then the voting engine 722 may determine that a trip has occurred (and EFS equipment such as loads 702 should be actuated); otherwise, the voting engine 722 may determine that no actual trip has occurred.

The priority logic block receives inputs from the voting block 722, 1E manual input block 716, and non-1E manual input block 714. The priority logic block 721 then makes a determination, based on all inputs, what to command the equipment control module to perform.

The equipment control block receives a command from the priority logic module and performs the appropriate actuation or manipulation on the component via the output block 720. The equipment control block receives feedback from the equipment via the equipment feedback block 718 for equipment control purposes.

The equipment control block 722, priority logic block 721, and voting block 722 each provide status information to the Maintenance Workstation (MWS) Bus (e.g., block 728). The communication blocks 724/726/728 consist of five separate communication ports (e.g., three safety data ports labeled 724, one port labeled 726, and one port labeled 728)). Each port may be functionally independent and is designated as either a Monitoring and Indication (M/I) Bus (e.g., block 726), Maintenance Workstation (MWS) Bus (e.g., block 728), or a Safety Data Bus (e.g., blocks 724).

FIG. 8 illustrates an example embodiment of a chassis 800 of a reactor protection system (e.g., MPS 145) that communicably couples one or more SFM 500, EIM 700, and CM 600. This figure provides an example of three SFM 500 or EIM 700 connected to four CM 600 in a chassis 800. In this example, there are five data bus paths shown. For example, there are three safety data ports 802 labeled X, Y, and Z, respectively. There is one data bus path 804 labeled M/I. There is one data bus path 804 labeled MWS. Each data bus path 802/804, in this example, may be functionally and electrically independent of every other data bus path 802/804 in the chassis 800.

In this illustrated embodiment, each of the CM 600 may include a master of one of the data bus paths 802/804. As illustrated, the master 808 of the X data bus path 802 is part of the CM 600 for safety data X. The master 810 of the Y data path 802 is the CM 600 for safety data Y. The master 812 of the Z data path 802 is the CM 600 for safety data Z. Finally, as shown in this example, the master 814 for the M/I data path 804 is the CM 600 for M/I. In this example as well, there is an MWS master 816 that is the master of the MWS data path 806, which is separately connected (e.g., as a Maintenance Workstation). The Maintenance Workstation (MWS master) 816 may be disconnected for normal operation of the equipment by a hardwired switch.

Figure 9A:
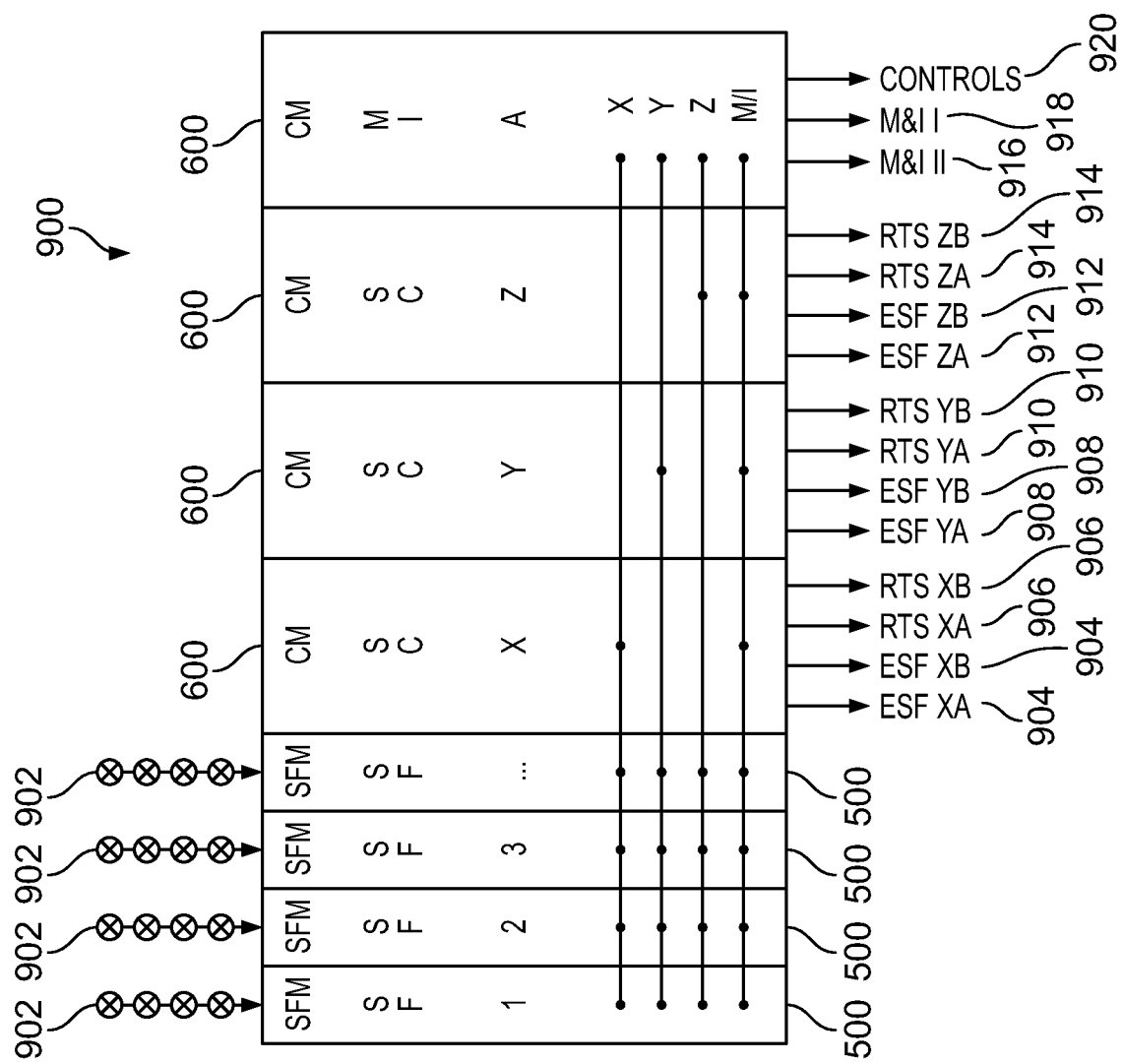
FIGS. 9A-9C illustrate block diagrams of trip determination-, RTS-, and ESFAS-level interconnects that utilize one or more of the SFM, CM, and EIM.
Figure 9B:
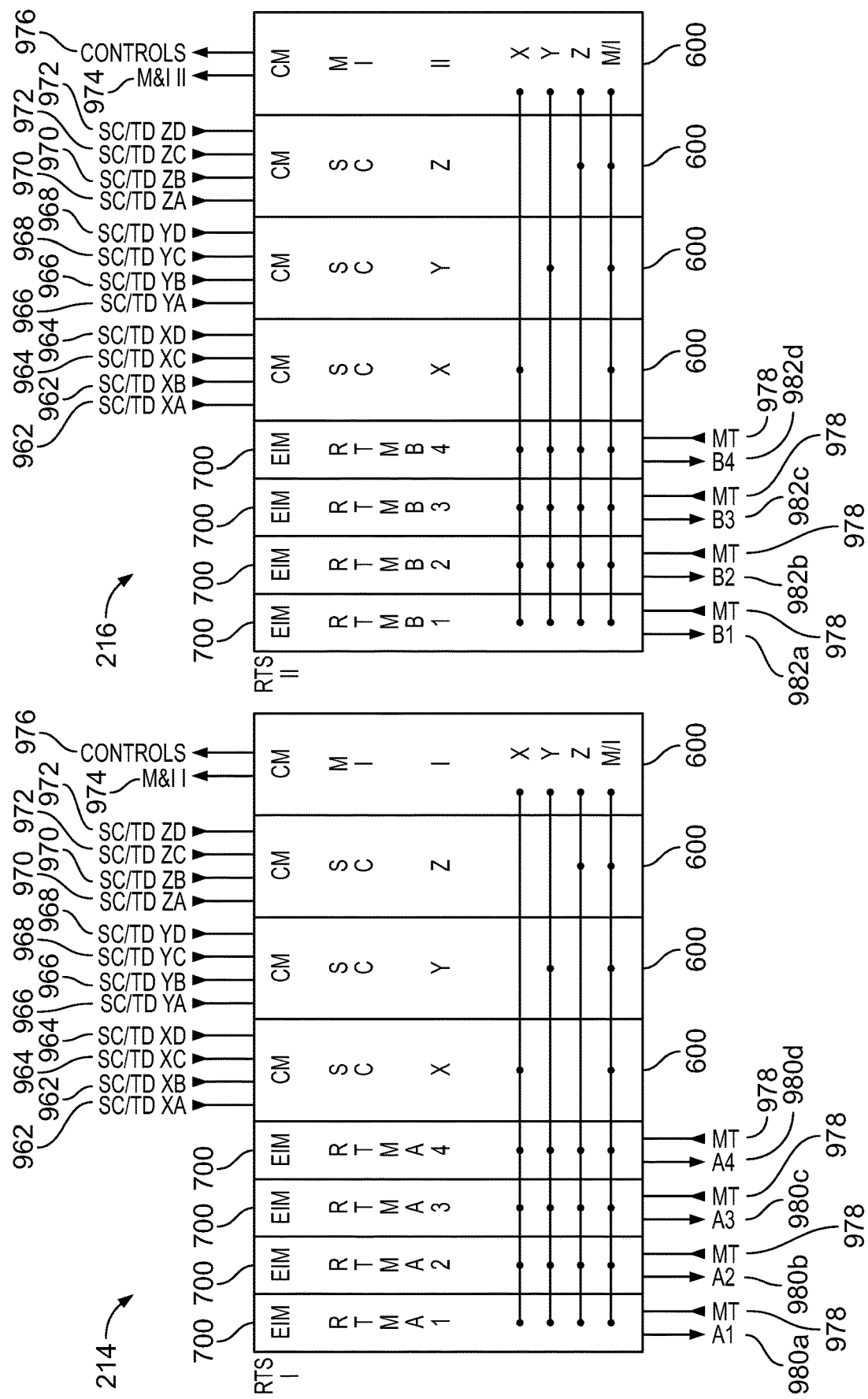
Figure 9C:
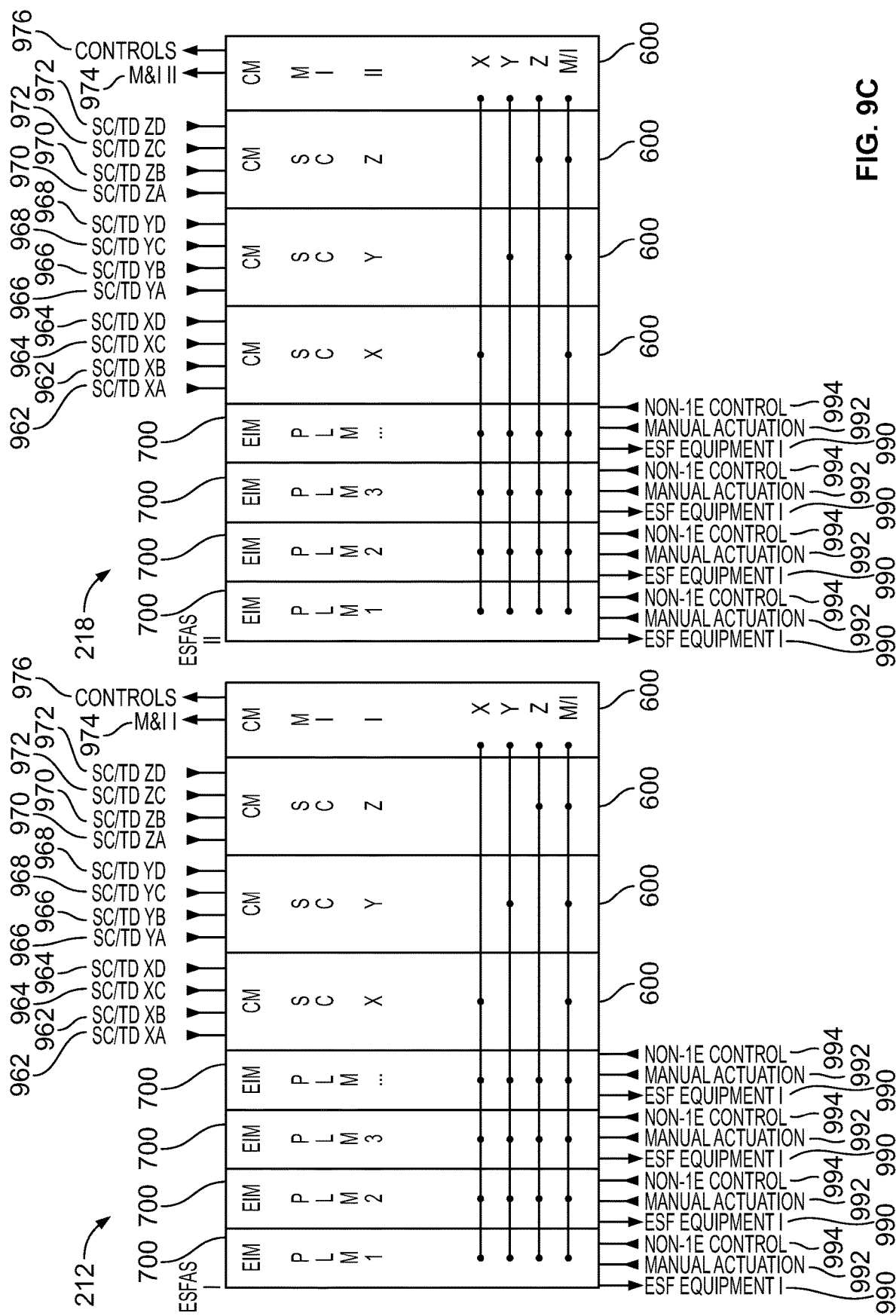

FIGS. 9A-9C illustrate block diagrams of separation group-, RTS-, and ESAFAS-level interconnects that utilize one or more of the SFM 500, CM 600, and EIM 700. Generally, the modules SFM 500, CM 600, and EIM 700 may be arranged within the MPS 200, for example, as functionally independent modules (e.g., an assembly of interconnected components that constitutes an identifiable device, instrument, or piece of equipment, and can be disconnected, removed as a unit, and replaced with a spare, with definable performance characteristics that permit it to be tested as a unit) that provide for protection against a single failure (e.g., hardware, software, or otherwise) from propagating to adjacent or other safety functions. The modules may provide for up to triple redundancy, in some implementations, for trip sensing and determination. The modules may also be arranged to provide for redundant RTS and ESFAS voting divisions, as described above. In some implementations, the modules may provide for independent trip voting modules per trip component (e.g., breaker, sensor, or otherwise).

In some cases, the modules provide for RTS voting while in other cases, the modules provide for ESFAS voting. With respect to the independence of each module, each module may make a determination for a particular trip component, separately from every other module dedicated to the particular trip component, to activate or not activate an RTS/ESFAS trip. In some implementations, determination of a valid communication of a trip determination may be made by majority (e.g., two out of three). In some implementations, the determinations may be made in a double voting scheme, in which a communication of a trip determination is validated by majority decision (e.g., two of three) and a secondary trip determination vote is by less than a majority vote (e.g., two of four).

Turning to FIG. 9A, an example separation group-level interconnect 900 is illustrated. The illustrated channel-level interconnect 900 includes: channel sensor inputs 902, SFMs 500 that receive the inputs 902, and CMs 600 that communicate outputs 904 through 920. As shown, to implement a single function or single set of functions, each SFM 500 in the channel-level interconnect 900 can contain four inputs 902, or more in some instances, in any combination of analog and digital. Each input 902 may be unique to a particular SFM 500 (e.g., a Channel A pressurizer pressure signal is a direct input to only one SFM 500). Input data along with status information (e.g., alarms, logic determination, module status) may be available on all four data buses.

The safety buses may be functionally independent and each use a master-slave protocol where the master is the CM 600. Although the blocks within a SFM operate synchronously, communication between modules may be asynchronous. When a CM 600 for a bus requests information from a particular SFM 500, the SFM 500 may respond with a broadcast to the bus. The benefit of the broadcast is that if, for example, the SFM 500 labeled "1" has information needed by the SFM 500 labeled "2" (e.g., permissive signal, sensor input value), then the SFM 500 "2" can listen and obtain the needed information.

In addition to the three safety data buses (e.g., labeled "X," "Y", and "Z"), there is a fourth illustrated communication bus for the Monitoring and Indication (M/I). The master of M/I bus may be the CM 600 dedicated to providing M/I data to safety gateways and non-safety control systems. Unlike the CM 600 for the three safety data buses (e.g., busses X, Y, and Z), the M/I CM 600 may be able to listen to broadcast information on all three safety buses.

In some implementations, a restricted communication block (RCB) of a CM 600 can have various point-to-point configurations. At the separation group-level interconnect 900, all four communication ports on the RCB may be configured for transmit only. Data from each safety data bus CM 600 (e.g., CMs 600 labeled X, Y, and Z) may be sent to each division of an RTS and ESFAS (e.g., divisions I and II). Data (e.g., outputs 916-920) from the M/I CM 600 may be sent to safety gateways and to non-safety control systems.

The outputs 904-914 may be provided, for example, to RTS- and ESFAS level interconnects (described below). For example, as illustrated, outputs 904, 908, and 912 may be provided to ESFAS-level interconnects, while outputs 906, 910, and 914 may be provided to RTS-level interconnects. Although only one separation group-level interconnect 900 is shown in FIG. 9A, there may be multiple interconnects 900 within an MPS structure.

Turning to FIG. 9B, an example RTS-level interconnect, split by division, is shown. RTS-level interconnects, as shown, include Division I and II of RTS (e.g., RTS voting 214 and 216). Each illustrated Division (214 and 216) includes four CM 600 and four EIM 700. For each Division, each of the three safety data buses (labeled X, Y, and Z) may receive a trip or no trip determination from all four separation groups, shown as inputs 962-972 (e.g., with separation groups labeled with the same numeral, i.e., A1 and B1). A fourth CM 600 may be provided, as shown, to transmit data (as outputs 974-976) to non-safety control systems and a safety gateway.

Each communication port on the RCB for each safety bus CM 600 may be configured for "Receive Only" and optically isolated (as described above). The M/I CM 600 may have all ports in the RCB configured to "Transmit Only."

In some implementations, trip determination for each safety data bus from all separation groups is available to each of the four EIMs 700. The EIMs 700 may use all three safety buses (labeled X, Y, and Z) to ensure there is no spurious actuation of breakers due to communication errors. When at least two of the four separation groups (inputs 962-972) indicate a trip condition, reactor trip breakers are opened. Each EIM 700 may be dedicated, for example, to a reactor trip breaker's undervoltage relay and shunt trip coil. In addition to automatic actuation, the EIM 600 will have input for a manual division-level reactor trip 978, breaker feedback, and ESFAS feedback.

The EIM 600 outputs (labeled 980a-980d for Division I and 982a-982d for Division II) may be coupled to inputs for trip coils for reactor trip breakers (RTB) (shown in FIG. 2B) associated with a particular division.

Turning to FIG. 9C, an example ESFAS-level interconnect, split by division, is shown. ESFAS-level interconnects, as shown, include Division I and II of ESFAS (e.g., ESFAS voting 212 and 218). Each illustrated Division (212 and 218) includes four CM 600 and four EIM 700. For each Division, each of the three safety data buses (labeled X, Y, and Z) receives ESF actuation determination from all separation groups (four in this example, labeled-D), which are labeled as inputs 962-972.

Each communication port in the RCB for each safety data bus CM 600 (labeled X, Y, and Z) may be configured for "Receive Only" and optically isolated (as described above). The M/I CM 600 may have all ports in the RCB configured for "Transmit Only" and optically isolated as well.

In some implementations, ESF actuation determination from all separation groups is available to the EIMs 700 on all three safety data buses (labeled X, Y, and Z). For example, the EIMs 700 may use all three safety data buses to ensure there is no spurious actuation of equipment caused by communication errors. When at least two of the four separation groups indicate a need for ESF actuation (e.g., on inputs 962-972) the safety function(s) may be initiated through outputs 990 (which are coupled to ESF equipment 224 and 226, based on division, as shown in FIG. 3B). In some aspects, each EIM 700 can be dedicated to an individual component (e.g., a single ESF component).

Aside from automatic initiation, each EIM 700 can use manual inputs 992 to control the component. Further, each EIM 700 may also receive a non-1E control input 994. The non-1E control input 994 (shown also as input 282 in FIG. 3B) may be provided to the EIM 700 for a non-1E to control the 1E safety ESF component on the outputs of the EIM. Component feedback (e.g., limit switches), voting determination, and other available information (e.g., alarms) may be transmitted from an M/I CM 600 as outputs 974-976.

Figure 10:
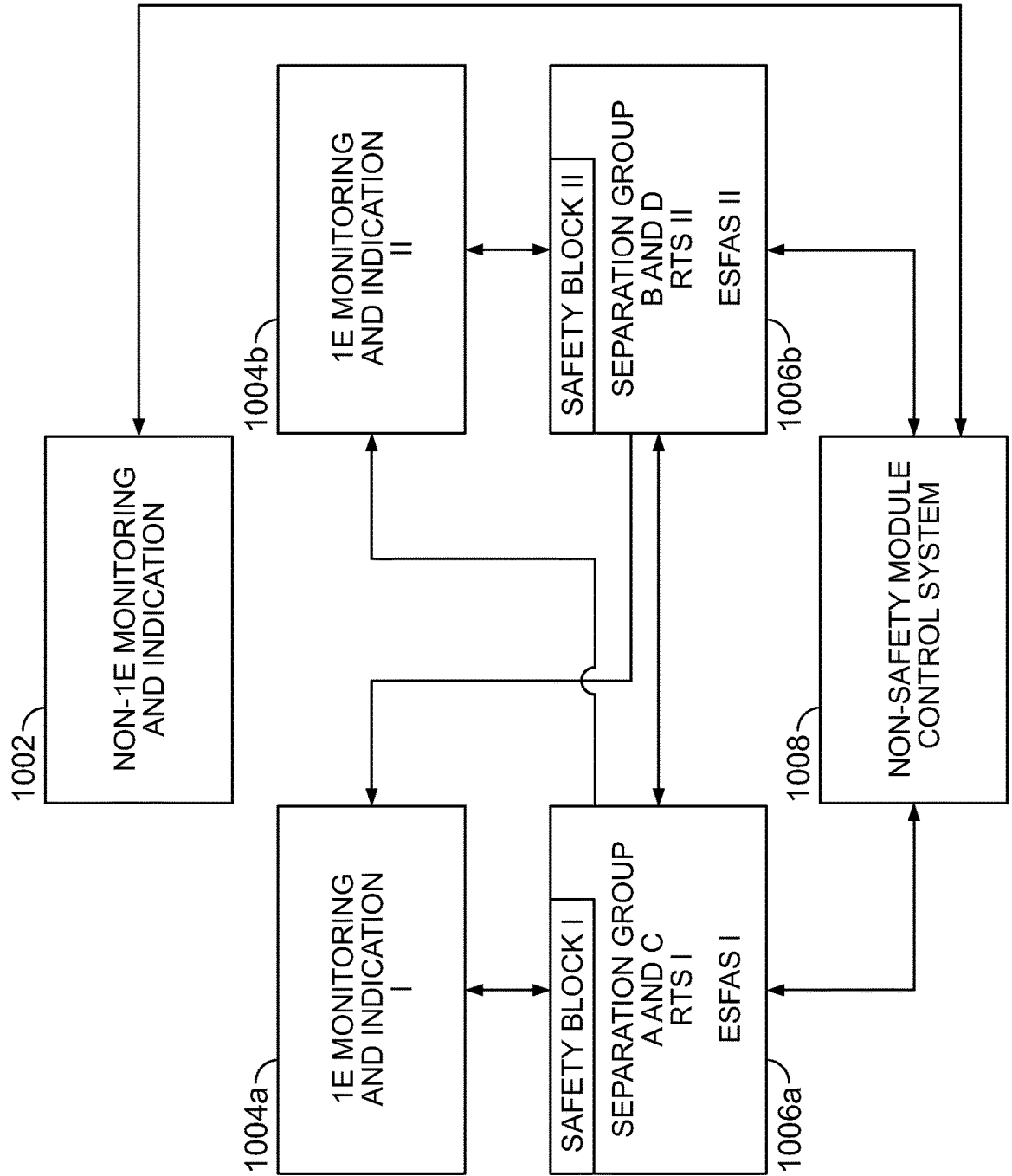
FIG. 10 illustrates a diversity analysis diagram for an MPS of an I&C system for a nuclear power system.

FIG. 10 illustrates a diversity analysis diagram for an I&C system 135 for a nuclear power system. For the purpose of a diversity analysis, the blocks identified in FIG. 10 represent a level of detail that simplifies system examination. Blocks have been selected to represent a physical subset of equipment and software whose internal failures can be assumed not to propagate to other blocks based on their attributes.

As illustrated, blocks in the diagram of FIG. 10 illustrate an I&C system; in this example, I&C system 135. Block 1002 represents the non-1E monitoring and indication equipment, block 1004*a/b* represent 1E monitoring and indication I and II, respectively, blocks 1006*a/b* represent Safety Blocks I and II, respectively. Block 1006*a* includes Separation Groups A and C, RTS I, and ESFAS I, while block 1006*b* includes Separation Groups B and D, RTS II, and ESFAS II. Block 1008 represents the MCS. As illustrated, connection lines with arrows indicate communication between blocks.

One of the purposes for the four echelons is Diversity. For example, the MPS may meet a single failure criterion, which may require the MPS to perform all safety functions required for a design basis event in the presence of: (1) any single detectable failure within the safety systems concurrent with all identifiable but non-detectable failures; (2) all failures caused by the single failure; and (3) all failures and spurious system actions that cause or are caused by a design basis event requiring the safety functions. This requirement may provide increased reliability, but does not preclude the system from being vulnerable to common-cause failures (CCFs). For any design, dependence (e.g., coupling factors) may exist, which distinguish CCFs from multiple independent failures. This leads to two basic forms of preventing common cause failures in a system: either the causal influences are reduced or the system's ability to resist those influences is increased.

Implementation of these two forms can be implemented in six attributes as described above: Design Diversity, Equipment Diversity, Functional Diversity, Human Diversity, Signal Diversity, and Software Diversity. Application of these attributes is examined with respect to each block illustrated in FIG. 10, as well as the attributes between blocks shown in FIG. 10.

Attributes within a Block

As illustrated and also described with reference to earlier figures, separation groups A, B, C, and D, and the two divisions of RTS and ESFAS, are grouped in accordance to the programmable technology on which they are based. Safety Block I and II, together, make up the Module Protection System (MPS) (e.g., MPS 200).

Regarding signal diversity, for a given transient event there may exist at least two safety functions where each is based on measured variable(s) of different physical effects (e.g., pressure, level, temperature, neutron flux). Loss of one safety function does not prevent a block from identifying the need for a protective action.

Regarding software diversity, based on its inputs, each safety function module (SFM 500) is dedicated to a safety function or a group of safety functions. As a result, each SFM has a unique algorithm/logic. Each communication module (CM 600) transmits the same packets of information in a different order, which may require that each communication engine (608/610) in the CM have a different algorithm. Each equipment interface module (EIM 700) may be dedicated to a single component and may result in unique algorithm/logic.

1E monitoring and indication may be accomplished using two divisions of video display units (VDUs) and physical switches. Each division of 1E monitoring and indication (M/I) may be a block 1004*a/b*. With respect to design diversity, each division of M/I may provide plant status information on digital displays to the operator and has manual switches to manually initiate, at the division level, any protective action. With respect to signal diversity, the operator may have all measured variables utilized by the MPS to determine if a trip and/or ESF actuation is needed. Although not as fast, the operator may have multiple measured variables of different physical effects to make the same determination as the MPS.

Diversity Attributes Between Blocks

Regarding human diversity, the software of Safety Block I and 1E M/I I may be designed by one design team, with Safety Block II and 1E M/1 II may be designed by a different design team. Additionally, independent verification and validation teams may review the work of each design team to ensure design correctness. The above mentioned design teams are also different from those assigned to the Module Control System (MCS) and the non-1E M/I.

Design diversity is the use of different approaches including both software and hardware to solve the same or similar problem. To limit the potential and the consequences of a CCF, Safety Block I 1004*a* and 1E M/I I block 1006*a* may use a different programmable technology than Safety Block II and 1E M/I II. MCS and Non-1E M/I may also have a different programmable technology. Along with other attributes discussed below, different hardware designs may have different failure modes and, thus, reduce the possibility of a CCF affecting more than one block. For example, except for M/I blocks, blocks may be physically separated into different rooms. This is intended to further reduce coupling factors that could create the condition for multiple components to be involved in a CCF event.

Software diversity is a subset of design diversity and may include the use of different programs designed and implemented by different development groups with different key personnel to accomplish the same safety goals. Due to the design diversity discussed above, the different design teams may use different design tools and, thus, the tools may not introduce the same failure modes.

Functional diversity may be introduced by having different purposes and functions between blocks. Safety Block I and II form the MPS. These blocks may initiate a reactor trip if operating limits are exceeded and initiate ESF to mitigate a postulated accident. The M/I blocks may allow for an operator to monitor and control both safety and non-safety systems. The operator can maintain a plant within operating limits or initiate necessary protective actions. MCS provides automatic control of systems to maintain the plant within operating limits including constraining certain operational transients.

Between blocks, signal diversity may be provided by having automatic and manual means of actuation equipment and protective actions. The MCS and Non-1E M/I provide control at the equipment level while the 1E M/I blocks provide control at the division level.

Equipment diversity is the use of different equipment to perform similar safety functions. Initiation of protective actions can be done by operator actions using switches or performed automatically by Safety Block I or II. Between Safety Block I and II, different programmable technology may be used, which may require different internal subcomponents and different manufacturing methods.

Another analysis guideline of the four echelons is System Failure types. Type 1 failures are those where protective actions fail to occur for plant transients initiated by control systems errors because of interactions between echelons of defense. Typically, this is associated with failure of a common sensor or signal source. Several of the plant parameters monitored by the MPS are provided to the MCS for normal plant control. As described above, instead of providing one signal source, all four separation groups and both divisions of ESFAS and RTS provide information through isolated one-way communications. This may allow for MCS to use different methods (e.g., median signal select) of selecting which redundant and independent signal source to use.

Type 2 failures may not directly cause a transient and are those where protective equipment may not respond to a plant transient because of an undetected failure. Using the attributes within and between Safety Block I and II, sufficient diversity may exist to prevent an undetected failure or a CCF from affecting more than one block. With only one of two blocks needed to automatically initiate the protective action, Type 2 failures may be mitigated by the MPS (Safety Block I and II) without any additional systems.

Type 3 failures are those where primary sensors relied on to detect design basis events produce anomalous readings. Signal diversity may exist within safety blocks by providing at least two safety functions, each based on different measured parameters, for any transient event. If all four separation groups of sensors for a given safety function provide anomalous readings, there may be two possible adverse scenarios for a Type 3 failure: 1) anomalous readings indicate that no trip or ESF actuation is needed when limits have actually been exceeded; and 2) anomalous readings indicate that a trip or ESF actuation is needed even though limits have not been exceeded (e.g., spurious trip or ESF actuation). In the first scenario, a Type 3 failure concurrent with a CCF within the safety blocks may not prevent initiation of the necessary protective action(s). As mentioned before, signal diversity may allow for a separate safety function to be available for mitigating a transient event. A CCF within MPS is limited to one of the two safety blocks and is assumed to either prevent initiation of protection action or prevent initiation with false indication. For example, as discussed above, a two out of four coincident logic may be used for all trip and ESF actuation, which means that two out of the four separation groups, for the unaffected safety function on the unaffected safety block, indicate a need for trip or ESF actuation and provide positive indication to the operator of action performed.

In the second scenario, the Type 3 failure concurrent with a CCF within the safety blocks, results in a spurious trip or ESF actuation with 1E M/I blocks indicating either one positive and one false indication of a successful actuation or one positive and one with no indication of actuation. In either case, it may take an operator longer to evaluate and correct the spurious actuation, but ability to re-align components as necessary is provided by both 1E and non-1E controls that would not be affected by the same CCF. A spurious ESF actuation may be considered the most limiting event in this scenario.

Figure 11:
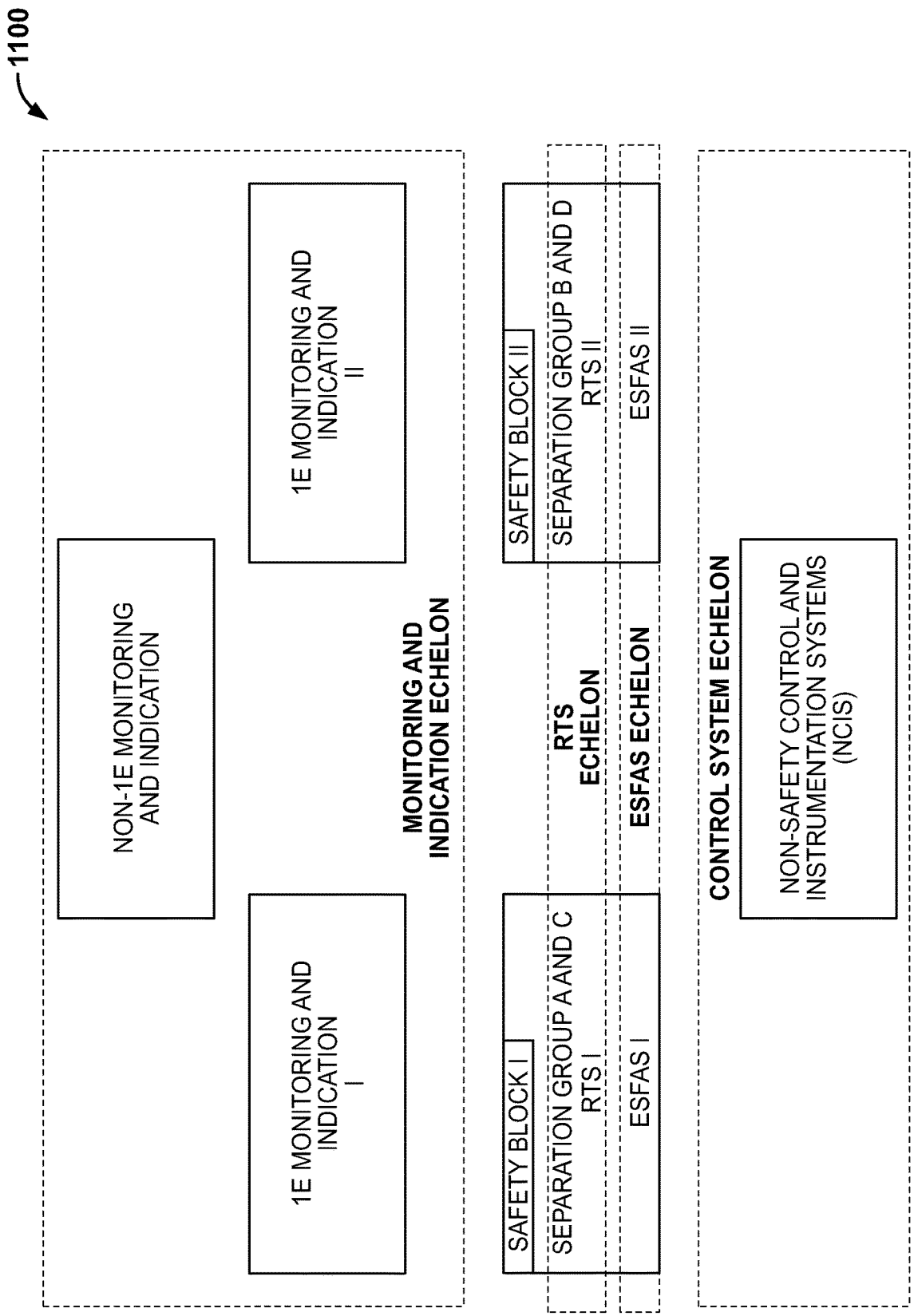
FIG. 11 illustrates a block diagram of an example separation of MPS blocks into the four echelons of defense.

Another analysis guideline is the Echelon Requirement. In order to provide blocks representing a level of detail that simplifies system examination, the four conceptual echelons of defense are not only combined (e.g., RTS and ESFAS) in some blocks but are also divided into separate blocks (e.g., Safety Block I and II, 1E M/I I and II). In some aspects, separation groups, RTS, and ESFAS are grouped into safety blocks according to the programmable technology on which they are based. For example, each half of MPS (e.g., two of four separation groups, one of two divisions of ESFAS, and one of two divisions of RTS) or one safety block may have sufficient diversity attributes. Different design teams (human diversity) utilizing different programmable digital hardware based on different programmable technology (design and equipment diversity) which requires the use of different design tools (software diversity). The M/I echelons may also be split into separate blocks. The 1E M/I blocks may be split to identify that they have similar diversity attributes as safety blocks. How the chosen blocks fall into the four echelons of defense is illustrated FIG. 11, which shows diagram 1100.

Another analysis guideline is the Method of Evaluation. Blocks chosen in should be considered as "black boxes," so that any credible failure required to be postulated produces the most detrimental consequence when analyzed in accordance with the Output Signals guideline (discussed below). In some aspects, the failure of a system to actuate might not be the worst case failure, particularly when analyzing the time required to identifying and responding to conditions resulting from a CCF in an automated safety system. Blocks will be evaluated based on a hardware CCF and software CCF. For each CCF, the block may be evaluated to have three possible outputs which may produce the most detrimental consequences: 1) fail-as-is with false indication or no action when required, 2) spurious initiation of function(s) with indication of successful actuation, and 3) spurious initiation of function(s) without indication of successful actuation. The EIMs within any of the safety blocks may not be considered to be vulnerable to software CCFs. For example, the EIM may be a priority logic module dedicated to a single ESF component or reactor trip breaker and interfaces with manual and automatic controls. Use of finite-state machines may allow for exhaustive testing of the functionality; including all possible inputs, device states, and outputs of the state machine. Based on its testability, EIM diversity attributes, and being dedicated to a single component, the EIM may be sufficiently simple that consideration of software based or software logic based CCF is not required.

Another analysis guideline is the Postulated Common-Cause Failure of Blocks. The 1E M/I blocks involve a combination of video display units (digital hardware) and manual controls (non-digital hardware). The VDUs may be designed for indication only and do not have the capability to control equipment. The manual controls in each 1E M/I block 1004*a/b* provide the operator the ability to initiate, at the division level, any protective action that is automatically performed by Safety Block I or II. With the indication and manual control being, in some examples, different hardware (e.g., digital vs. open/close contact switches), a CCF can be assumed to affect one or the other, but not both. For both a software and hardware CCF, a fail-as-is condition results in one division of operator displays indicating false safe operating conditions or failure of one division of manual switches. The VDUs may have little or no control capabilities so they may not provide spurious actuation; however, with a software CCF the VDUs may provide false indication of a successful actuation or provide incorrect plant conditions requiring an operator to initiate spurious protective actions.

For the exception of the EIM, modules within a safety block are postulated to have a software CCF. Due to the diversity attributes within a safety block, a software CCF may be limited to a CM or function(s) on an SFM. A software CCF within a safety block that prevents a SFM from making a proper trip determination may be mitigated by equipment, signal, and software diversity within that block. For each transient event, the primary and backup safety functions required to mitigate the event may be implemented on separate safety functions using different logic/algorithm based on measured parameters of different physical effects. With the implementation of triple module redundancy and each data bus transmitting the same information in a different manner, a CM with software CCF may not spuriously initiate or prevent initiation of a protective action. As a result, the most detrimental scenario may be a software CCF in an SFM that results in spurious actuation of an ESFAS function.

A hardware CCF within a safety block may be postulated to be a complete failure of the block to detect and initiate the necessary protective actions. A hardware CCF that results in spurious actuation of ESF functions may have the same affects as a spurious actuation due to software CCF and, thus, may not be considered again for hardware CCF.

Non-1E M/I includes controls for safety and non-safety equipment. The VDUs for non-1E are diverse from those used by 1E M/I. Since non-1E M/I is used for normal day-to-day operations, any spurious actuations induced by a software or hardware CCF within non-1E M/I subsystem (e.g., turbine controls, feedwater control) may be immediately identifiable and, if exceeding operating limits, may be mitigated by the MPS (Safety Blocks I and II). The postulated failures for non-1E are failing in an as-is condition with 1) spurious actuation of a subsystem's components with and without indication of successful actuation and 2) indication of successful actuation when no equipment was actually actuated.

MCS encompasses the non-safety systems relied on to maintain day-to-day plant operations within operating limits including constraining certain operational transients. As such, any failures of subsystems (e.g., rod control) may be immediately detected by an operator. Similar to non-1E M/I, the postulated software and hardware CCF for MCS results in a fail as-is condition with 1) spurious actuation of a subsystem's components with and without indication of successful actuation and 2) providing indication of successful actuation when no equipment was actually actuated.

Another analysis guideline is the Use of Identical Hardware and Software Modules. Here, the diversity between blocks provides the basis for not considering blocks to be identical. Based on this, a postulated CCF may be limited to a single block.

Another analysis guideline is the Effect of Other Blocks. All blocks are assumed to function correctly in response to inputs that are correct or incorrect. Each block is considered to be independent and unaffected by a postulated CCF in another block.

Another analysis guideline is Output Signals. In some aspects, the I&C architecture may prevent errors from propagating backwards into the output of a previous block. All information from Safety Block I and II to 1E M/I may be sent through optically-isolated transmit-only communication engines (as shown in CM 600). Signals from 1E M/I to safety blocks may be open/close contacts from manual switches whose position or contact state cannot be changed by a CCF in safety blocks. The communication between safety blocks may be data sent from separation group A and C to Division II of ESFAS and RTS, and separation group B and D to Division I of ESFAS and RTS. The four separation groups are independent and redundant; however, for illustrative purposes of FIG. 10, the separation groups are grouped into safety blocks according to the programmable technology it uses. Similar to communication between safety blocks and 1E M/I, communication from separation groups to any division of RTS and ESFAS may be through optically isolated transmit-only communication engines. Non-safety inputs to safety blocks may be to the ESFAS EIMs, which may be limited to isolated open/close contacts.

All inputs from safety blocks may be from optically isolated transmit-only communication engines. This may prevent any error in 1E M/I from propagating backwards to the safety blocks.

Another analysis guideline is Diversity for Anticipated Operational Occurrences. A single CCF or a Type 2 failure in conjunction with a transient event may not prevent the MPS from performing its safety function. Safety Block I and II, which together make up the MPS, may be chosen to limit a CCF to one block. Traditionally, nuclear plants have relied on a Diverse Actuation System (DAS) or Anticipated Transient without Scram (ATWS) System to provide a diverse method of initiating functions if the MPS was disabled by a CCF. But in the illustrated MPS design, sufficient diversity may exist within the system to initiate safety functions even with a single CCF. Here, the MPS is split into Safety Block I and II (e.g., 1006a/b). A postulated software or hardware CCF would be limited to one safety block. Each block uses different design teams (human diversity) utilizing different programmable digital hardware based on different programmable technology (design and equipment diversity), which may require the use of different design tools (software diversity). Within either block, there may exist at least two safety functions based on measured variable(s) of different physical effects that are implemented on separate SFMs. All logic may be implemented in finite-state machines and all safety data may be communicated in a deterministic manner. Due to these attributes, even a Type 3 failure in conjunction with a CCF may not prevent the MPS from initiating the necessary protective action.

Another analysis guideline is Diversity for Accidents. Similar to AOO, postulated accidents in conjunction with a CCF error within MPS may not prevent MPS from performing its safety function.

Another analysis guideline is Manual Operator Action. Manual division-level actuations of protective actions performed by the MPS may be provided to the operator. Manual component-level controls are provided to the operator using non-1E M/I if permitted by 1E M/I.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A nuclear reactor protection system, comprising:
 a plurality of functionally independent modules, each of the modules configured to receive a plurality of inputs from a plurality of sensors, and logically determine a safety action based at least in part on the plurality of inputs, wherein each of the independent modules performs a plurality of different independent safety functions with a plurality of unique logic engines each dedicated to implementing an associated one of the different safety functions, and wherein at least some of the plurality of functionally independent modules include multiple input modules coupled between a different one of the sensors and a different safety function module, each of the input modules independently conditioning the input from the coupled one of the sensors and sending a conditioned output to the coupled one of the safety function modules; and one or more nuclear reactor safety actuators communicably coupled to the plurality of functionally independent modules to receive the safety action determination based at least in part on the plurality of inputs.

2. The nuclear reactor protection system of claim 1, wherein individual independent modules include an engineered safety features actuation system (ESFAS), and the plurality of functionally independent modules receive a plurality of ESFAS inputs and logically determine an ESFAS component actuation based at least in part on the ESFAS inputs.

3. The nuclear reactor protection system of claim 2, wherein the plurality of functionally independent modules generate redundant ESFAS voting decisions.

4. The nuclear reactor protection system of claim 1, wherein the plurality of functionally independent modules receive a plurality of reactor trip system (RTS) inputs and logically determine an RTS component actuation based at least in part on the RTS inputs.

5. The nuclear reactor protection system of claim 4, wherein the plurality of functionally independent modules generate redundant RTS voting decisions.

6. The nuclear reactor protection system of claim 1, wherein each of the plurality of functionally independent modules provides protection against a single hardware failure propagation to any other of the plurality of functionally independent modules.

7. The nuclear reactor protection system of claim 1, wherein each of the plurality of functionally independent modules provides protection against a single software failure propagation to any other of the plurality of functionally independent modules.

8. The nuclear reactor protection system of claim 1, wherein each of the plurality of functionally independent modules provides protection against a single software developed logic failure propagation to any other of the plurality of functionally independent modules.

9. The nuclear reactor protection system of claim 1, wherein the plurality of functionally independent modules include triple redundant signal paths for sensing a reactor trip condition.

10. The nuclear reactor protection system of claim 1, wherein the plurality of functionally independent modules include independent trip voting modules.

11. The nuclear reactor protection system of claim 1, wherein the plurality of functionally independent modules determine a reactor trip condition separately from every other module of the plurality of modules.

12. The nuclear reactor protection system of claim 1, wherein the plurality of functionally independent modules include independent ESFAS actuation voting modules.

13. The nuclear reactor protection system of claim 1, wherein the plurality of functionally independent modules logically determine an engineered safety feature (ESF) actuation for the one or more nuclear reactor safety actuators separately from every other module of the plurality of modules.

14. The nuclear reactor protection system of claim 1, wherein the plurality of functionally independent modules comprise a plurality of safety function modules.

15. The nuclear reactor protection system of claim 1, wherein the plurality of functionally independent modules comprise a plurality of communication modules.

16. The nuclear reactor protection system of claim 1, wherein the plurality of functionally independent modules comprise a plurality of equipment interface modules.

17. The nuclear reactor protection system of claim 1, wherein the plurality of functionally independent modules logically determine the reactor trip in a single-tier voting scheme.

18. The nuclear reactor protection system of claim 1, wherein the plurality of functionally independent modules logically determine the reactor trip in a multiple-tier voting scheme.

19. The nuclear reactor protection system of claim 18, wherein the multiple-tier voting scheme comprises a two-tier voting scheme.

20. The nuclear reactor protection system of claim 19, wherein a first tier of the two-tier voting scheme comprises a majority voting scheme.

21. The nuclear reactor protection system of claim 20, wherein the majority voting scheme comprises a two out of three voting scheme.

22. The nuclear reactor protection system of claim 19, wherein a second tier of the two-tier voting scheme comprises a non-majority vote scheme.

23. The nuclear reactor protection system of claim 22, wherein the second tier comprises a two out of four vote scheme.

24. A method for determining a nuclear reactor trip, comprising:
receiving, from one of an engineered safety features actuation system (ESFAS) or a reactor trip system (RTS), a plurality of inputs at a plurality of functionally independent modules of a nuclear reactor protection system, wherein at least some of the functionally independent modules include multiple input modules coupled between a different sensor and a different safety function module, each of the input modules independently conditioning the input from the coupled sensor and sending a conditioned output to the coupled safety function module;
logically determining, with the plurality of functionally independent modules, one of an ESFAS safety action or reactor trip determination, based at least in part on the plurality of inputs; and
based on the logical determination, activating one of an ESFAS component actuator or a reactor trip breaker communicably coupled to the plurality of functionally independent modules.

25. The method of claim 24, further comprising limiting, with one of the plurality of functionally independent modules, a single failure propagation to any other of the plurality of functionally independent modules.

26. The method of claim 25, wherein the single failure comprises at least one of: a single hardware failure, a single software failure, or a single software developed logic failure.

27. The method of claim 24, wherein logically determining, with the plurality of functionally independent modules, one of an ESFAS safety action or reactor trip determination, based at least in part on the inputs comprises:

logically determining, with the plurality of functionally independent modules, the ESFAS safety action or reactor trip determination through a triple redundancy signal path.

28. The method of claim 24, wherein the plurality of functionally independent modules provide for at least one of redundant RTS voting divisions or redundant ESFAS voting divisions.

29. The method of claim 24, wherein logically determining, with the plurality of functionally independent modules, one of an ESFAS safety action or reactor trip determination, based at least in part on the inputs comprises:
   logically determining, with the plurality of functionally independent modules, the ESFAS safety action or reactor trip determination through independent trip voting modules per reactor trip component.

30. The method of claim 29, wherein logically determining, with the plurality of functionally independent modules, one of an ESFAS safety action or reactor trip determination, based at least in part on the inputs comprises:
   logically determining, with a particular module of the plurality of functionally independent modules, the ESFAS safety action or reactor trip determination separately from every other module of the plurality of modules.

31. The method of claim 24, wherein the plurality of functionally independent modules provide comprise independent ESFAS actuation voting modules per ESF component, the method further comprising:
   logically determining, with a particular module of the plurality of functionally independent modules, the ESFAS actuation separately from every other module of the plurality of modules dedicated to the particular ESF component.

32. The method of claim 24, wherein the plurality of functionally independent modules comprise a plurality of safety function modules, a plurality of communication modules, and a plurality of equipment interface modules.

33. The method of claim 24, wherein logically determining, with the plurality of functionally independent modules, one of an ESFAS safety action or reactor trip determination, based at least in part on the inputs comprises:
   logically determining, with the plurality of functionally independent modules, the ESFAS safety action or reactor trip determination in a single-tier voting scheme.

34. The method of claim 24, wherein logically determining, with the plurality of functionally independent modules, one of an ESFAS safety action or reactor trip determination, based at least in part on the inputs comprises:
   logically determining, with the plurality of functionally independent modules, the ESFAS safety action or reactor trip determination in a multiple-tier voting scheme.

35. The method of claim 34, wherein the multiple-tier voting scheme comprises a two-tier voting scheme.

36. The method of claim 35, wherein a first tier of the two-tier voting scheme comprises a majority voting scheme.

37. The method of claim 36, wherein the majority voting scheme comprises a two out of three voting scheme.

38. The method of claim 35, wherein a second tier of the two-tier voting scheme comprises a non-majority vote scheme.

39. The method of claim 38, wherein the second tier comprises a two out of four vote scheme.

* * * * *

UNITED STATES PATENT AND TRADEMARK OFFICE
CERTIFICATE OF CORRECTION

| | | |
|---|---|---|
| PATENT NO. | : 11,017,907 B2 | Page 1 of 1 |
| APPLICATION NO. | : 14/198891 | |
| DATED | : May 25, 2021 | |
| INVENTOR(S) | : Gregory Wayne Clarkson et al. | |

It is certified that error appears in the above-identified patent and that said Letters Patent is hereby corrected as shown below:

In the Specification

In Column 12, Line 13, delete "range" and insert -- range. --.
In Column 20, Line 54, delete "ESAFAS" and insert -- ESFAS --.
In Column 24, Line 20, delete "M/1" and insert -- M/I --.

Signed and Sealed this
Eighth Day of November, 2022

Katherine Kelly Vidal
*Director of the United States Patent and Trademark Office*